(12) United States Patent
Pribula et al.

(10) Patent No.: US 6,386,337 B2
(45) Date of Patent: May 14, 2002

(54) HEAVY DUTY BRAKE ACTUATOR

(76) Inventors: Timothy J. Pribula, 23 Sandy Hills La.; Brian Breidenbach, 909 Campbell Dr., both of Grand Forks, ND (US) 58201

( * ) Notice: Subject to any disclaimer, the term of this patent is extended or adjusted under 35 U.S.C. 154(b) by 0 days.

(21) Appl. No.: 09/738,255

(22) Filed: Dec. 15, 2000

Related U.S. Application Data

(60) Provisional application No. 60/171,175, filed on Dec. 16, 1999.

(51) Int. Cl.$^7$ ............................................... B60T 7/20
(52) U.S. Cl. ................................. 188/112 R; 188/3 H
(58) Field of Search ............................ 188/112 R, 3 H, 188/3 R, 142, 149, 125, 126, 150; 303/7; 280/446.1, 447, 432, 460.1, 428

(56) References Cited

U.S. PATENT DOCUMENTS

| | | | | |
|---|---|---|---|---|
| 3,241,639 A | * | 3/1966 | De Puydt et al. | 188/112 R |
| 3,734,540 A | * | 5/1973 | Thiermann | 280/482 |
| 3,892,296 A | * | 7/1975 | De Puydt et al. | 188/112 R |
| 4,813,698 A | * | 3/1989 | Grinwald | 280/460.1 |
| 5,013,059 A | * | 5/1991 | Goettker | 280/446.1 |
| 5,485,900 A | * | 1/1996 | Denny | 188/112 R |
| 5,551,539 A | * | 9/1996 | Frymaire | 188/112 R |
| 5,678,664 A | * | 10/1997 | Marasco | 188/112 R |
| 5,771,996 A | * | 6/1998 | Marasco | 188/112 R |
| 5,855,418 A | * | 1/1999 | Greaves, Jr. | 303/7 |
| 5,954,164 A | * | 9/1999 | Latham | 188/112 R |

* cited by examiner

Primary Examiner—Christopher P. Schwartz
Assistant Examiner—Benjamin A Pezzlo
(74) Attorney, Agent, or Firm—Law Offices of Royal W. Craig

(57) ABSTRACT

An improved trailer coupling with integral brake actuator that employs sturdier telescoping inner and outer casings and adjustable rollers there between to compensate for wear and tear tolerances over time. The outer casing is a hollow tubular outer beam, and the inner case is formed as a section of hollow I-beam adapted for a telescoping fit inside the outer case. A plurality of rollers are secured to each side of the outer case and project inwardly to provide bearing support against the outwardly-projecting lateral ridges of the I-beam, and this results in a substantially frictionless telescoping extension. Each roller is selectably offset on an axle to allow adjustment of the degree of support against the lateral ridges of the I-beam, thereby allowing compensation for increased wear tolerances over time. The device also employs an improved damping system including a pair of damping cylinders between the telescoping inner and outer casings, plus a master brake cylinder mounted on damped spring-brackets. A safety release assembly is also provided, and this includes a chain coupled at one end to the towing vehicle and coupled at the other end to a break-away lever that is pivotally mounted atop the outer case in operative engagement with the master cylinder. This way, inadvertent separation of the towing vehicle from the coupling/brake actuator activates the master cylinder to apply the trailer brakes to prevent accidents.

14 Claims, 25 Drawing Sheets

TOP
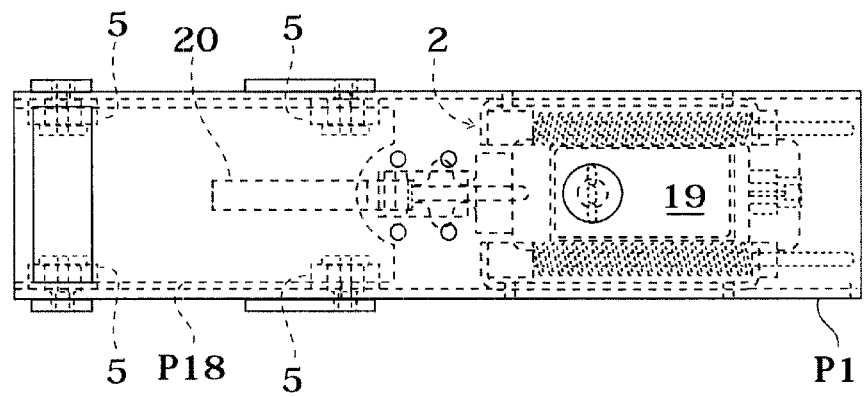
SIDE
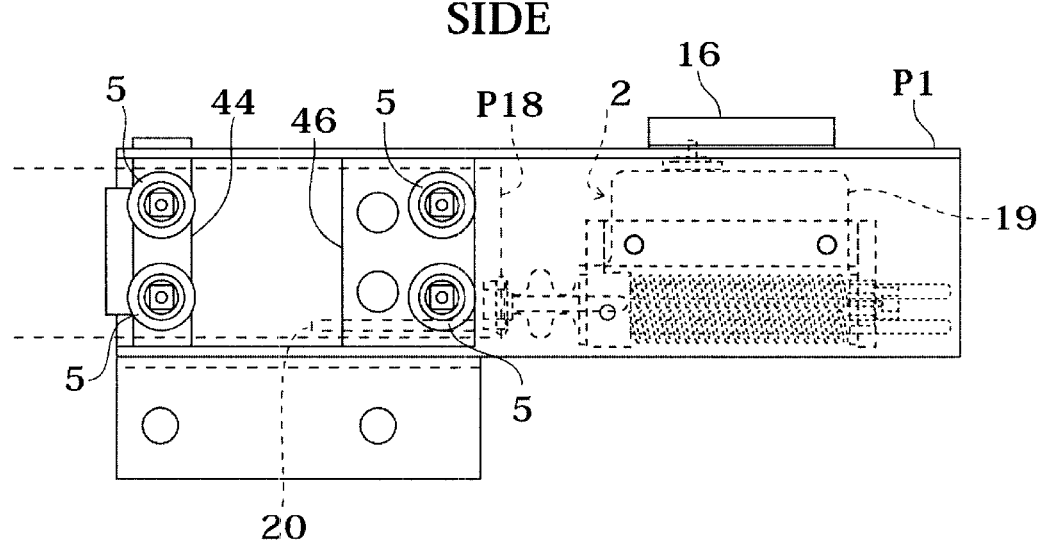
Fig 2

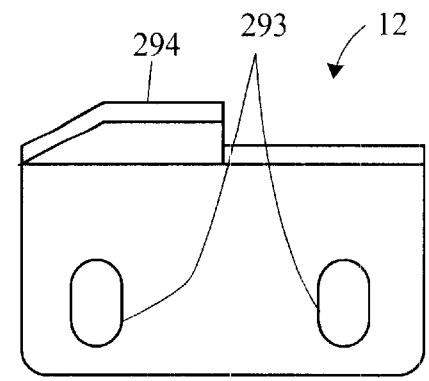
(A)
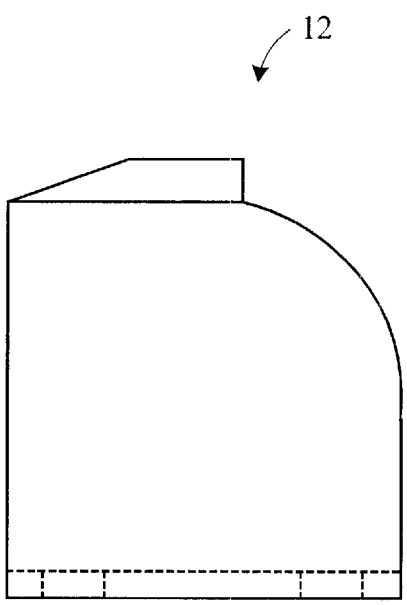
(B)
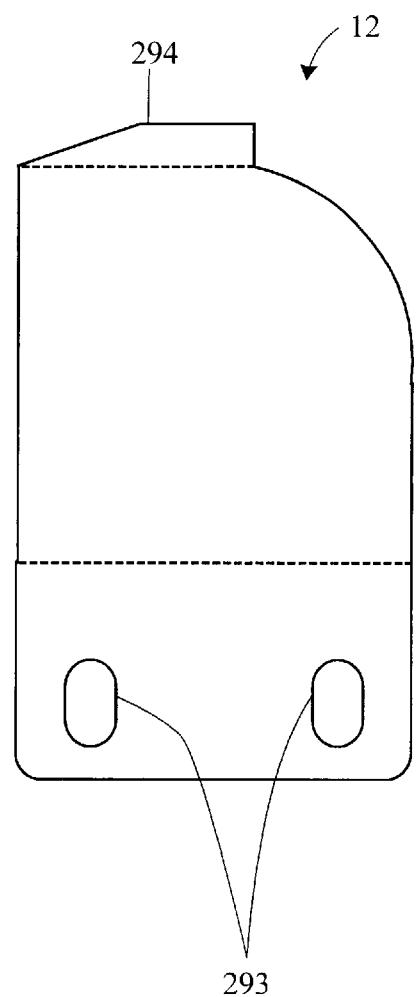
(C)
FIG. 17

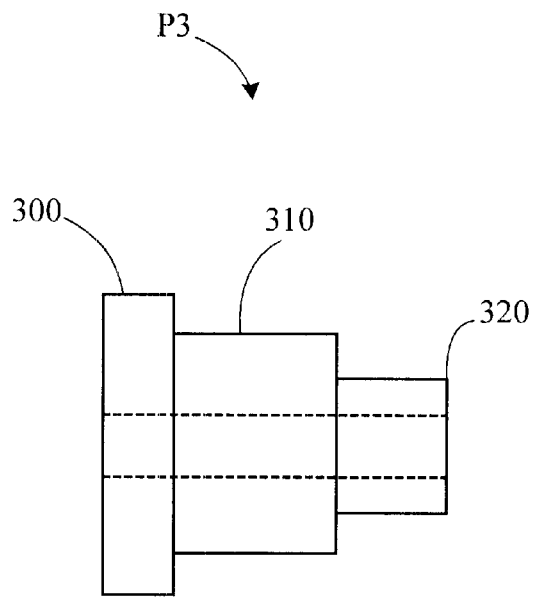
(A)
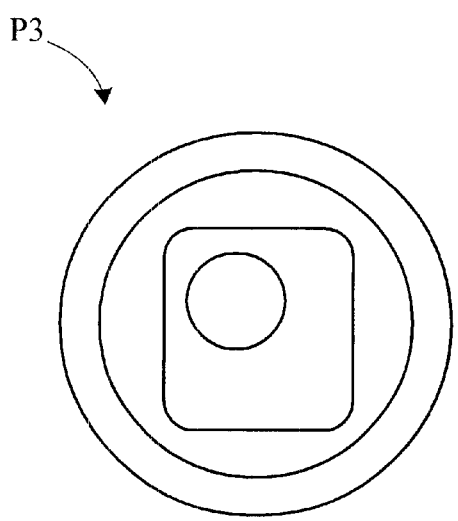
(B)
FIG. 19

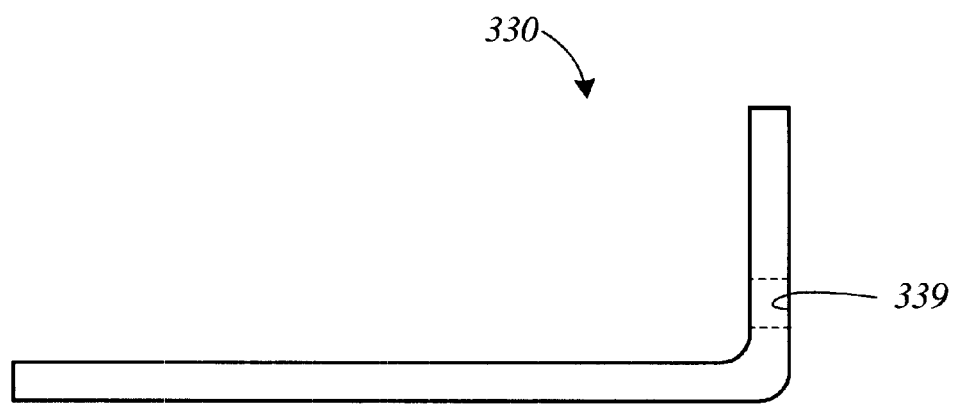
(A)
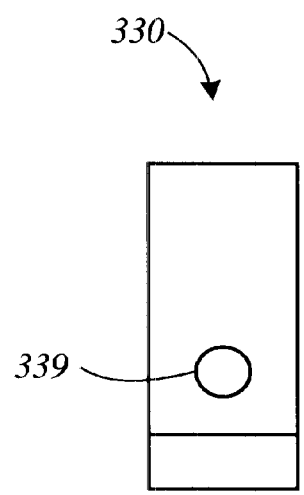
(B)
*FIG. 22*

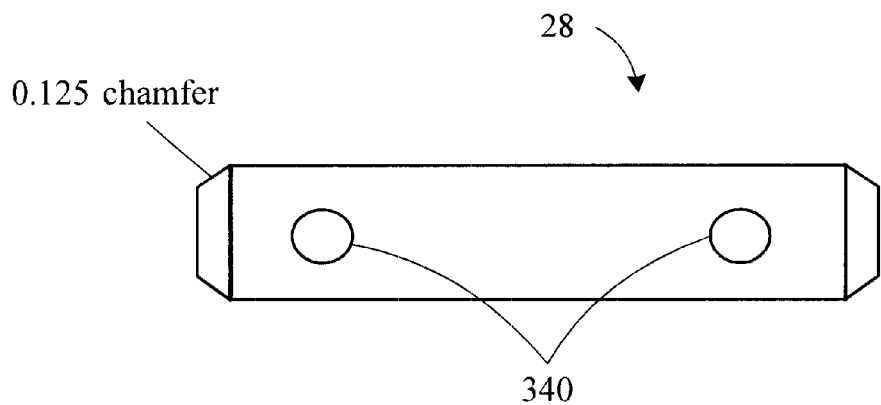
(A)
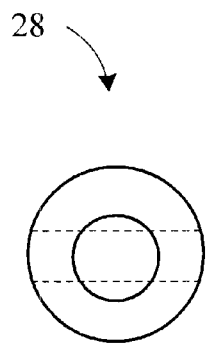
(B)
FIG. 23

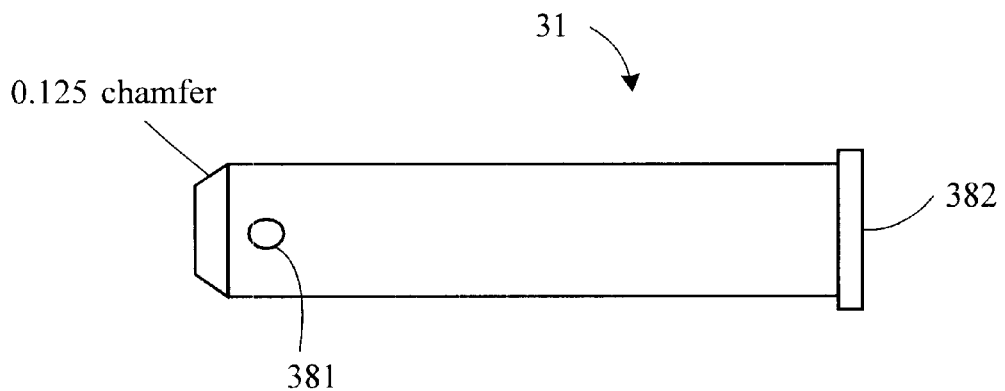
(A)
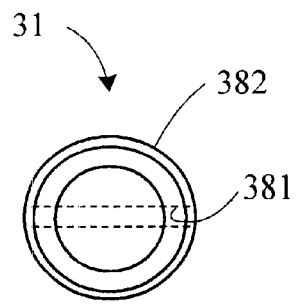
(B)
FIG. 24

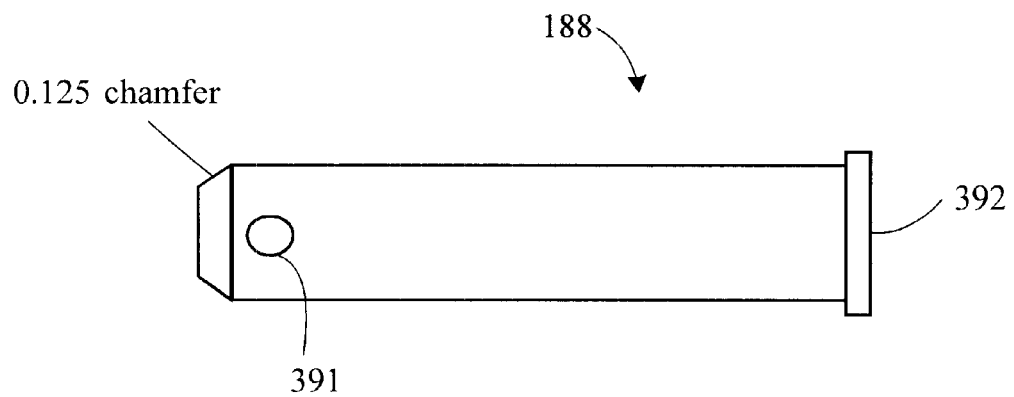
(A)
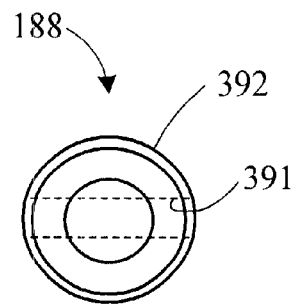
(B)
FIG. 25

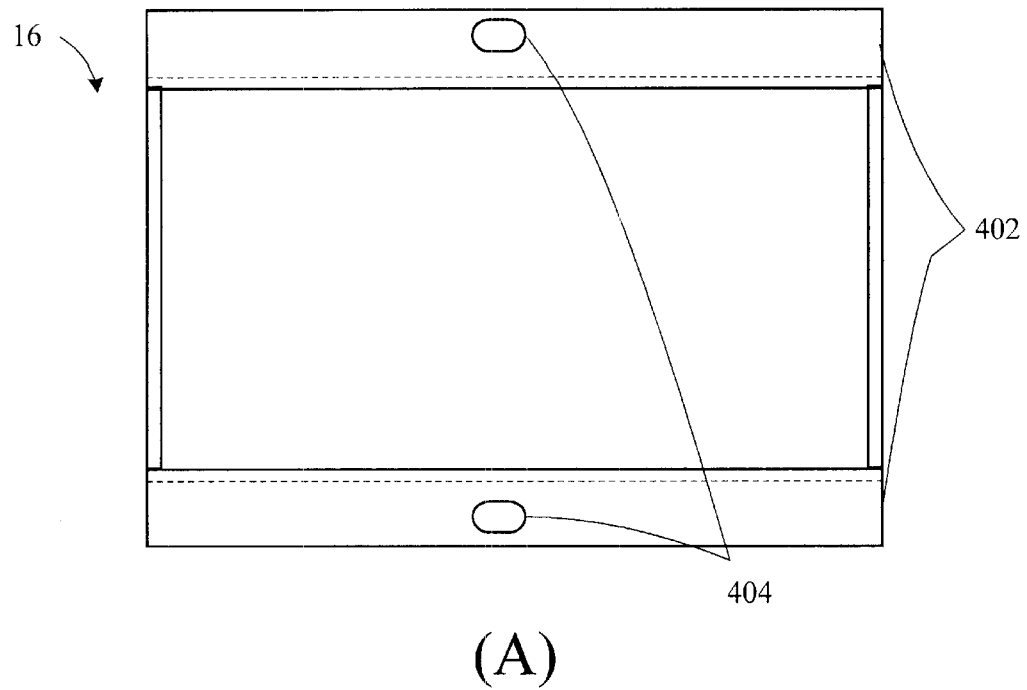
(A)
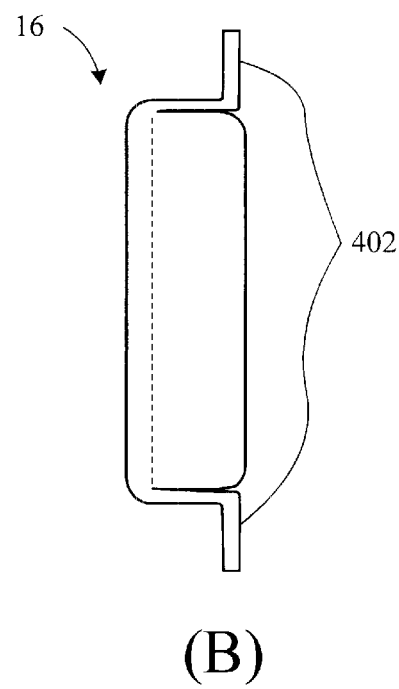
(B)
FIG. 26

HEAVY DUTY BRAKE ACTUATOR

CROSS-REFERENCED TO RELATED APPLICATIONS

The present application derives priority from U.S. Provisional Patent Application No. 60/171,175 for "HEAVY DUTY BRAKE ACTUATOR"; Filed: Dec. 16, 1999.

BACKGROUND OF THE INVENTION

1. Field of the Invention

The present invention relates to brake actuators for coupling vehicles with trailers and other towed transports having pneumatic brakes. More specifically, the invention is a heavy duty design for a brake actuator with structural enhancements to increase ruggedness and reliability over others presently on the market.

2. Description of the Background

There are a wide variety of commercially-available couplings incorporating brake actuators for utility trailers, boat trailers and the like which trailers are equipped with conventional pneumatic wheel brakes. The brake actuators serve to apply the brakes of the trailer as the trailer approaches the pulling vehicle. During towing, when the pulling vehicle decelerates by applying its brakes, the inertia of the trailer causes a forward force upon the towing vehicle. The trailer begins to override the towing vehicle. When this occurs, the trailer brake actuator applies the trailer brakes to reduce the force of inertia in the trailer. This greatly reduces the amount of work required for the pulling vehicle's brakes to stop the trailer. When the pulling vehicle accelerates, or remains at constant speed, the inertia and/or drag of the trailer is responsible for creating a tensile force between the trailer and pulling vehicle. This tensile force deactivates the actuator; hydraulic pressure to the brakes is released and braking is eliminated. This allows the actuator to function only when the trailer is forcing the pulling vehicle forward and not when the pulling vehicle is pulling the trailer.

The design of most trailer brake actuation systems is to have an outer casing which is connected to the trailer, and an inner casing which is to be telescopically operated within the outer casing connected to the pulling vehicle. A typical design for the outer casing is to have complicated geometry and to be formed as a welded assembly of components. It is the telescopic action of the inner casing relative to the outer casing that actuates the master cylinder, which is responsible for hydraulically activating the trailer brakes. For example, U.S. Pat. No. 3,783,982 to Wells discloses a telescoping tongue and brake actuator assembly for brake-equipped trailers which can be extended without disconnecting the braking structure. A motion dampening spring 76 is included. However, the illustrated coupling employs a simple telescoping square-beam design that is subject to frictional wear and tear. Over time it has been found that the wear and tear impedes the cooperation of the parts and eventually causes catastrophic stress fractures. This design has in the past been successful for light duty environments and/or highway conditions in the application of the brakes, thereby preventing the forward force created by the trailer's inertia upon the towing vehicle. But under heavy loading, rough environment, or off road conditions, and over extended periods of operation these systems presented problems that were never perfected, only remedied by the frequent replacement of these units. These devices presented strength and durability flaws focused upon, in general, the outer casing and/or inner casing. Buckling or bending of these components is common therefore the initial strength of these components is of concern. The telescopic action between the inner casing and outer casing is also of concern. This telescopic action is accomplished in general by the sliding of the outer casing over the inner casing. It is this sliding action that creates problems due to the extreme friction created between the casings. Over time, this friction wears away the walls of the inner and outer casings, substantially weakening these components as well as increasing the amount of clearance between the components, thereby causing them not to fit tight enough. This "slop" adds substantially to the strength problems already discussed herein above.

Partial solutions to the above-described situation have been suggested. For instance. U.S. Pat. No. 5,013,059 to Goettker shows a brake actuator/coupler in which a square inner casing 46 fits within a square outer casing 18, and pins 8 through oblong slots 70, 72, 74 and 76 give a sliding degree of freedom. Rollers are used to reduce friction. Specifically, a front roller 40 and rear rollers 42 protrude through inner casing 46 and bear against outer casing 18 to facilitate sliding. A single damping shock absorber 84 is used. While the use of rollers helps, there are still significant torsional stresses and wear and tear issues that renders the design unsuitable for many heavy-duty industrial applications. Even with the rollers, wear and tear over time introduces significant tolerances that can leave the rollers ineffective. Consequently, this and like designs continue to fail after prolonged use on test tracks.

Accordingly, there remains a significant need for a more rugged coupling design that combines a sturdier telescoping casing with adjustable rollers to compensate for wear and tear tolerances. The additional use of plural damping shocks and other structural enhancements are capable of giving a level of ruggedness and reliability that far exceeds other coupling/brake actuator units presently on the market.

SUMMARY OF THE INVENTION

It is, therefore, an object of the present invention to provide a heavy duty trailer coupling with integral brake actuator that employs a sturdier telescoping casing and rollers to compensate for wear and tear tolerances.

It is another object to provide adjustable rollers for adjustment of the telescoping inner and outer casings to compensate for increased wear tolerances over time.

It is another object to incorporate a damping system inclusive of plural damping cylinders between the telescoping inner and outer casings, plus a damped master brake cylinder.

It is another object to provide heavy duty inner and outer casings, the inner casing being welded to control tighter tolerances.

In accordance with the above objects, an improved heavy duty trailer coupling with integral brake actuator is provided. The trailer coupling/brake actuator generally comprises a hollow tubular outer beam, and an inner case formed as a section of hollow I-beam and adapted for a telescoping fit inside the outer case. The outer casing may be made from a single piece of reinforced square tubing. Having a solid rolled tube as the basis for the actuator greatly increases the strength of the actuator. The outer casing is reinforced by welded steel straps on the outside, and this increases its strength as well.

The inner casing is made from a welded assembly in the shape of a double I-beam. Tight tolerances are kept to ensure that the desired distance is kept between the inner and outer casing. This increases the strength of the inner casing and provides a surface for which the rollers can run on as described.

A plurality of rollers are secured to the sides of the outer case and projecting inwardly to provide bearing support against the outwardly-projecting lateral ridges of the I-beam, and this results in a substantially frictionless telescoping extension. Each of the rollers preferably comprises a wheel mounted on a selectably-offset axle to allow adjustment of the degree of support against the lateral ridges of the I-beam. This adjustment feature allows compensation for increased wear tolerances over time.

A master pneumatic brake cylinder is mounted inside the outer case for engagement with the inner case.

A safety release assembly is provided, and this includes a chain coupled at one end to the towing vehicle and coupled at the other end to a break-away lever that is pivotally mounted atop the outer case and is in operative engagement with the master cylinder. This way, inadvertent separation of the towing vehicle from the coupling/brake actuator activates the master cylinder to apply the trailer brakes to prevent accidents.

In addition, an improved damping configuration is provided. Specifically a plurality of master pins are inserted through corresponding grooves through the side walls of the inner case. A pair of damping cylinders are pivotally anchored inside the inner case and each has a piston rod attached to a corresponding one of the master pins. The pneumatic master cylinder for actuating the trailer brakes is separately damped. The pneumatic master cylinder is mounted inside the outer case and has a piston operatively engaged with the inner case for applying the trailer brakes. The pneumatic master cylinder is mounted in the outer case on spring-brackets to provide overload protection. In this regard the spring-brackets engage upon excessive pressure applied to the hydraulic system.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 2 is a composite drawing that includes a top view cross-section and side view cross-section of the nested inner case P18 (dotted lines) and outer case P1 of the coupling/brake actuator 1 as in FIG. 1.

FIG. 17 is a composite drawing showing a top view, side view and pattern view (counterclockwise from top) of one of the lever locks 12,13 as in FIG. 14.

FIG. 19 is a composite side view and end view of an exemplary roller axle P3.

FIG. 22 is a composite side view and end view of the angled push-rod lever 330.

FIG. 23 is a composite side view and end view of the push-rod pin 28 for insertion through holes in the walls of the I-beam 187.

FIG. 24 is a composite side view and end view of an exemplary master pin 31 for insertion through the push rod collar of the pneumatic cylinder 29.

FIG. 25 is a composite side view and end view of an exemplary damper pin 188 for insertion through the collar of a pneumatic cylinder 29.

FIG. 26 is a composite side view and end view of an exemplary access cover 16.

DETAILED DESCRIPTION OF THE PREFERRED EMBODIMENTS

Figure 1:
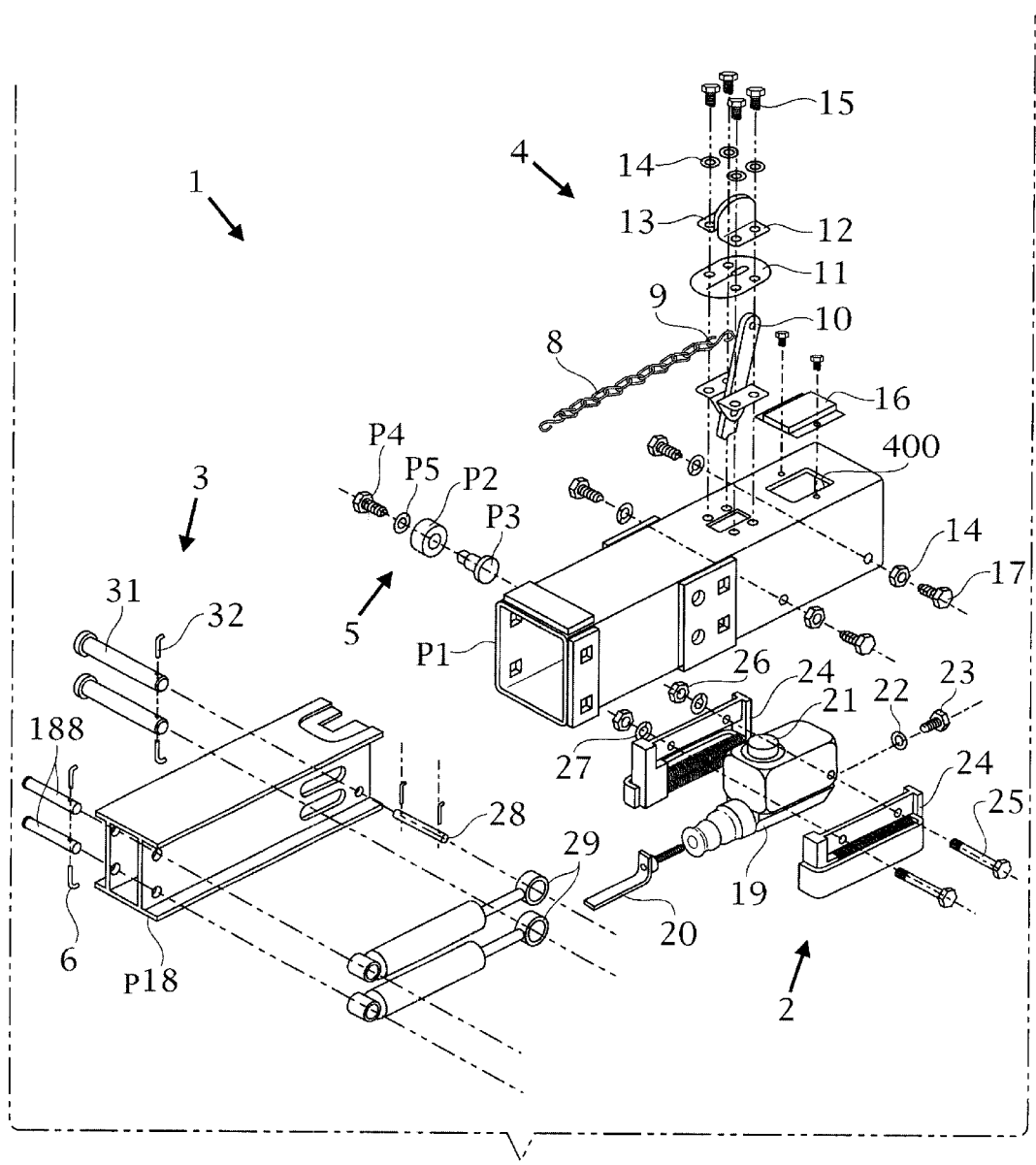
FIG. 1 is an exploded perspective view of the trailer coupling and brake actuator 1 according to the present invention.

FIG. 1 is an exploded perspective view of the trailer coupling and brake actuator 1 according to the preferred embodiment of the present invention. Coupling/brake actuator 1 includes a reinforced square tubular outer case (or tongue) P1 that houses both a master cylinder assembly 2 and a safety release assembly 4. An inner case assembly 3 inclusive of an inner case P18 is inserted in one end of outer case P1 for a telescoping fit therein, the inner case assembly 3 being mounted on adjustable rollers 5 for decreased friction between inner case P18 and outer case P1. The outward extension of inner case assembly 3 is limited by two master pins 31 and is preferably damped by at least two pneumatic damping cylinders 29 attached between the inner case assembly 3 and master cylinder assembly 2 by master pins 31. A towing vehicle can be coupled to a trailer via the coupling/brake actuator 1, and for this purpose a conventional trailer hitch (not seen in FIG. 1) may be anchored against the forward end of inner casing P18. A typical trailer hitch may include a forwardly projecting lunette (to be described) that catches a hook-type hitch mounted on the towing vehicle. The trailer hitch and lunette configuration are well-known and not considered to form a part of the invention being described herein. The forward pull of the towing vehicle pulls the outer case P1 outward and the tensile force is transmitted through damping cylinders 29 to the inner case assembly 3 and to the trailer. This tensile force extends the inner casing P18 with respect to the outer casing P1, effectively rendering the master cylinder assembly 2, and subsequently the trailer brakes, inactivated. Upon deceleration of the towing vehicle, such as is caused by the applying of brakes or letting up on the accelerator, the initial tendency is for the trailer to overrun the towing vehicle. The inner case assembly 3 compresses inward into the outer case P1 against the resistance of damping cylinders 29. This allows for insignificant variations in relative speed of the trailer and the towing vehicle. Braking of the towing vehicle also activates the master cylinder 19 to apply the trailer brakes. The inner casing P18 and pin 28 move aft relative to the outer casing P1, and this pushes a push-rod assembly 20 into the master cylinder 19 and effectively applies the trailer brakes.

Safety release assembly 4 operates to prevent accidents in case the trailer inadvertently becomes uncoupled. Safety release assembly 4 includes a breakaway chain 8 attached to the towing vehicle to pull the top of a pivoted break-away lever 10. The bottom of lever 10 bears against and activates the master cylinder 19 to apply the trailer brakes. Lever lock brackets 12 hold the break-away lever 10 in place once it has been activated. Thus, the trailer comes to an immediate stop when it becomes uncoupled.

FIG. 2 is a composite drawing that includes a top view cross-section and side view cross-section of the coupling/brake actuator 1 according to the present invention. The inner case assembly P18 (dotted lines) rides upon eight adjustable rollers 5, a set of four rollers 5 being mounted internally on each of the two vertical walls of outer casing P1. The master cylinder assembly 2 (inclusive of master cylinder 19) is secured inside the outer case P1, and master cylinder 19 operates through push-rod assembly 20 which is operatively engaged with the inner case assembly 3 (bearing against a push-rod pin 28 at the leading end of the I-beam inner case assembly P18).

Figure 3:
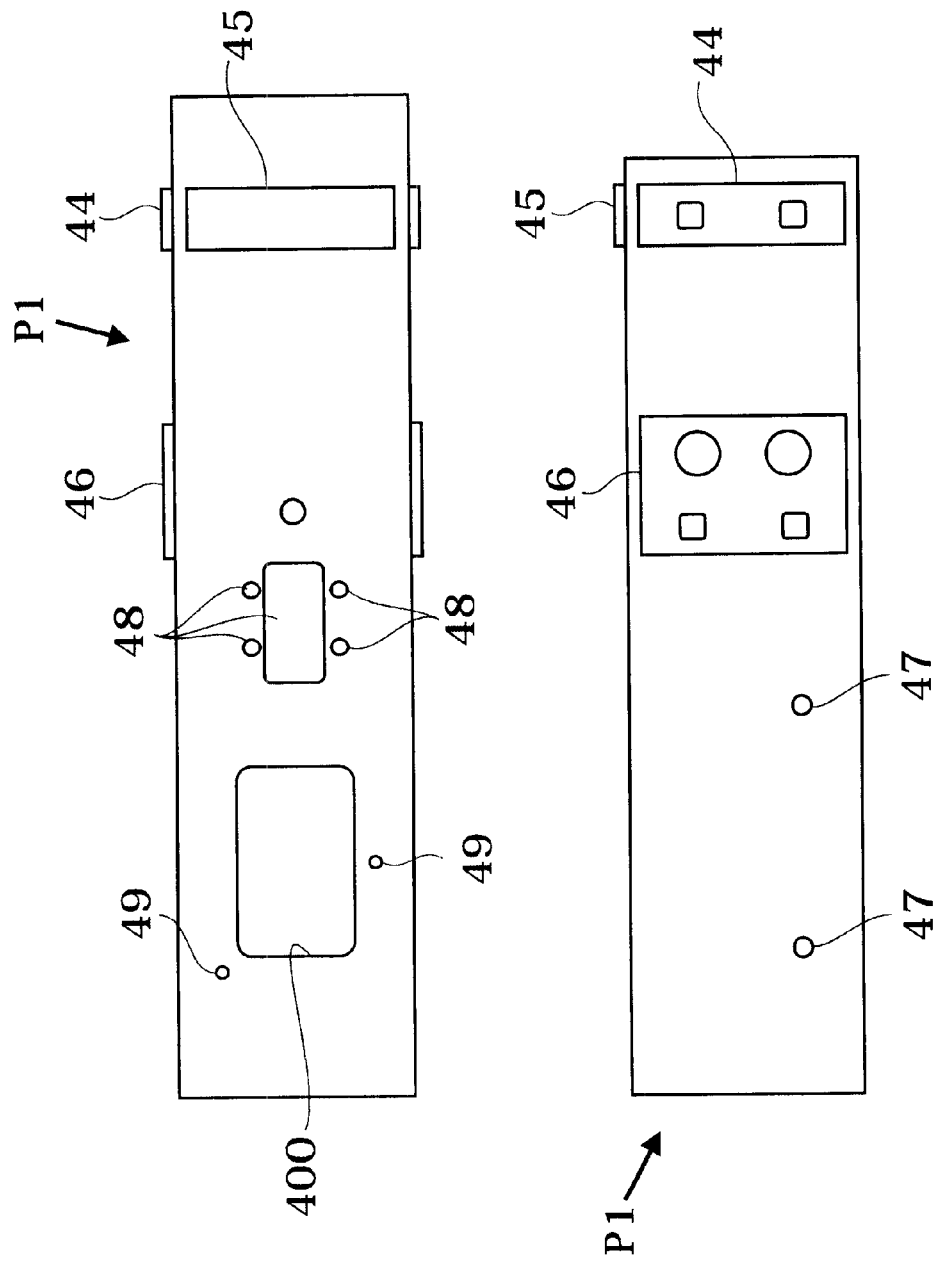
FIG. 3 is a composite drawing that includes a top view and side view of the outer case P1 of FIG. 1.

FIG. 3 is a composite drawing that includes a top view and side view of the outer case P1. The outer case P1 is a generally square tubular section of ³⁄₁₆" steel. The outer case P1 is machined in places for mounting of the various components, and it is a significant feature of the present invention that certain machined areas are reinforced by welded steel plates. This reinforcement contributes greatly to the structural reliability. Specifically, a pair of 2.81"×4"×¼" steel master pin straps 46 are welded to each side of the outer case P1 . Each master pin strap 46 corresponds to the position where a pair of master pins 31 and adjacent pair of spaced rollers 5 are mounted, respectively (see, also, FIG. 2). In addition, a trio of 4"×1.25"×¼" steel front straps 44, 45 are welded to each front side of the outer case P1 as shown. The two opposing front straps 44 correspond to the positions where opposing pairs of spaced rollers 5 are mounted (see, also, FIG. 2). Top front plate 45 is a solid strip welded across the top of the outer case P1 at the forward edge. A pair of square holes is formed through the outer case P1 and each master pin strap 46 to seat the ends of the axles of the forward spaced rollers 5. Likewise, a pair of round holes is formed through the outer case P1 and each master pin strap 46 to seat the ends of the master pins 31. This way, the master pin straps 46 effectively double the length of the apertures for seating the master pins 31 and the roller 5 axles, and the extra reinforcement greatly reduces egging of the holes. Likewise, a pair of square holes is formed through the outer case P1 and each opposing front strap 44 to seat the ends of the axles of the aft spaced rollers 5. The steel front straps 44, 45 and master pin straps 46 also reinforce the outer casing P1 and reduce wear between the two casings P1, P18. Other holes 47, 48, 49 are drilled in the illustrated positions for mounting the respective master cylinder assembly 2, the safety release assembly 4, and an access cover 16 (to be described). In addition, a rectangular window 400 is formed to provide access to the fill cap 21 of the master cylinder 19. and this covered by an access cover 16 to be described.

Figure 4:
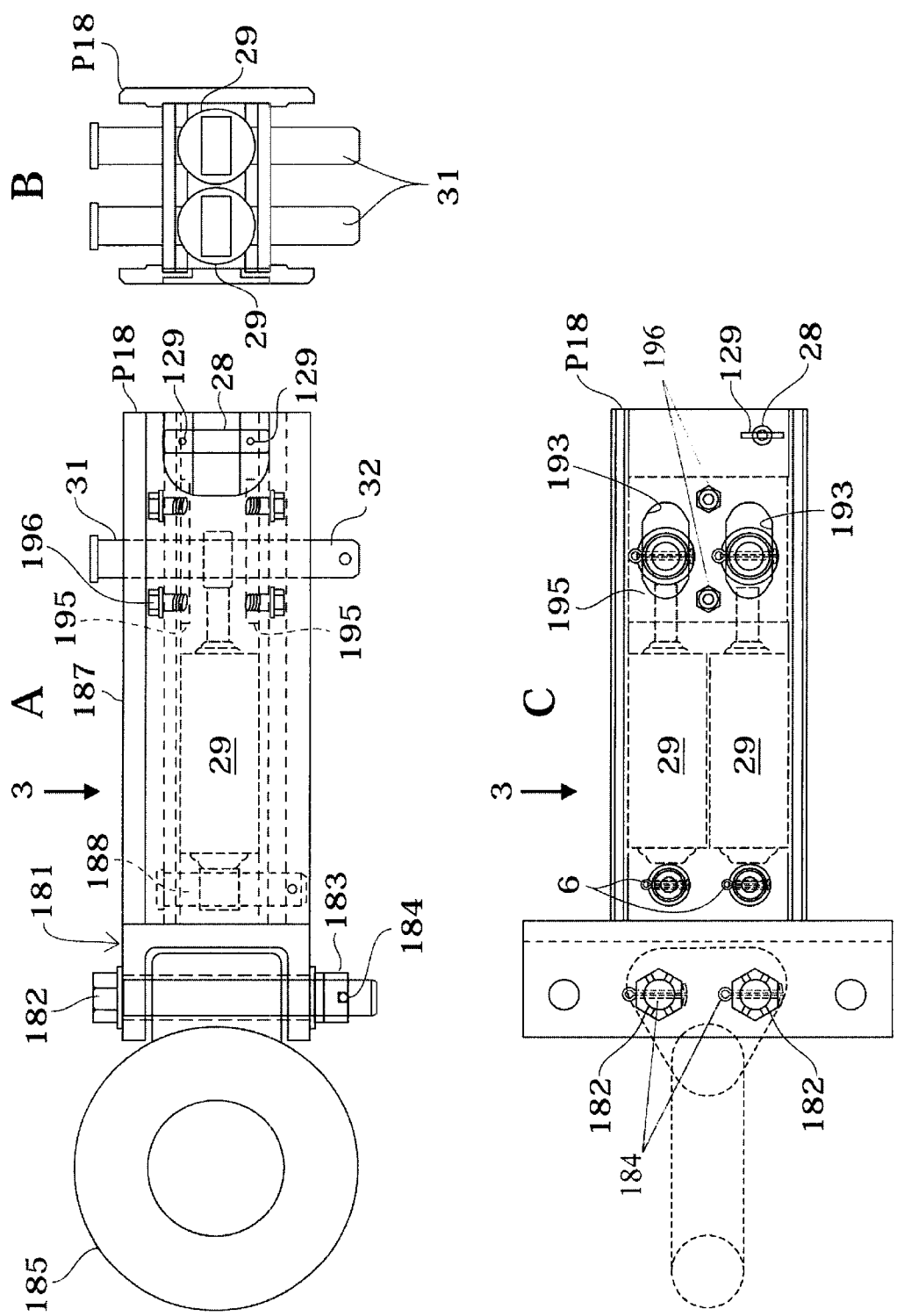
FIG. 4 is a composite drawings that includes a top view, end view and side view (clockwise from top) of the inner case assembly 3 of FIG. 1.

FIG. 4 is a composite drawing that includes a top view (A), end view (B) and side view (C) (clockwise from top) of the inner case assembly 3. The inner case assembly 3 includes the inner case P18 itself and a number of attachments thereto. One end of the inner case P18 is formed as a trailer coupling according to the intended application, and a variety of standard trailer coupling configurations are known to exist. For instance, other attachments better suited for ball hitches or the like may be readily substituted. One exemplary trailer coupling is shown in FIG. 4 and this includes a yoked portion 181 with opposing flanges machined to receive a coupling bolt 182. The coupling bolt 182 may be secured by a conventional lock washer 183 and cotter pin 184. A circular lunette 185 formed with an integral collar is pivotally attached to the coupling bolt 182 for attachment to the towing vehicle. The yoked portion 181 of the inner case P18 is integrally formed and the remaining length comprises a section of hollow I-beam 187. A pair of pneumatic cylinders 29 are pivotally attached at one end inside the hollow of the I-beam 187. This attachment is accomplished by a pair of spaced damper pins 188 each carried within opposing holes formed in the walls of I-beam section 187. Damper pins 188 are each inserted through the holes and through the collar of a corresponding pneumatic cylinder 29 as shown, and are secured in place by cotter pins 6. The push rods of the pneumatic cylinders 29 are each secured to a corresponding master pin 31. The master pins 31 ride along oblong grooves 193 formed in both walls of the I-beam section 187. To reduce the frictional wear of the sliding master pins 31, the grooves 193 in the walls of the I-beam section 187 are reinforced with side reinforcement plates 195 (also formed with aligned oblong grooves). The side reinforcement plates 195 are secured in place to the walls inside the hollow of the I-beam 187 by threaded bolts 196 (preferably, two bolts 196 at the mid section of each side reinforcement plate 195). In addition, a push-rod pin 28 is secured in place at the leading end of the I-beam 187 by insertion through holes in the walls of the I-beam 187. The push-rod pin 28 is pre-drilled with distal through-bores to accept two cotter pins 129 which hold the push-rod pin 28 from the inside of the hollow I-beam to facilitate clearance for the roller wheels 5.

Figure 5:
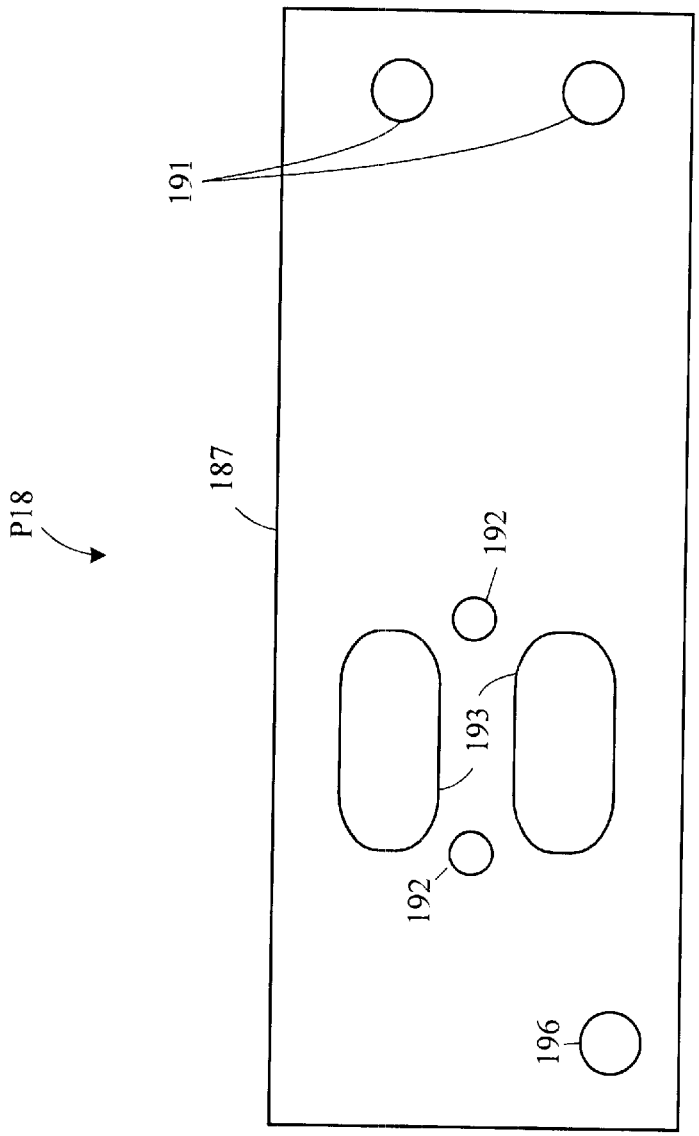
FIG. 5 is a side view of the I-beam section 187 of the inner case P18 of FIG. 1.

FIG. 5 is a side view of the I-beam section 187 of the inner case P18. Oblong grooves 193 are formed as shown through both walls. Holes 192 are formed as shown to accept the bolts 196 for attachment of the side reinforcement plates 195. Holes 191 are formed proximate the opposing end for attachment of the pair of spaced damper pins 188 (each of which captures a corresponding pneumatic cylinder 29). Holes 196 are formed as shown through both walls to accept the push-rod pin 28.

Figure 6:
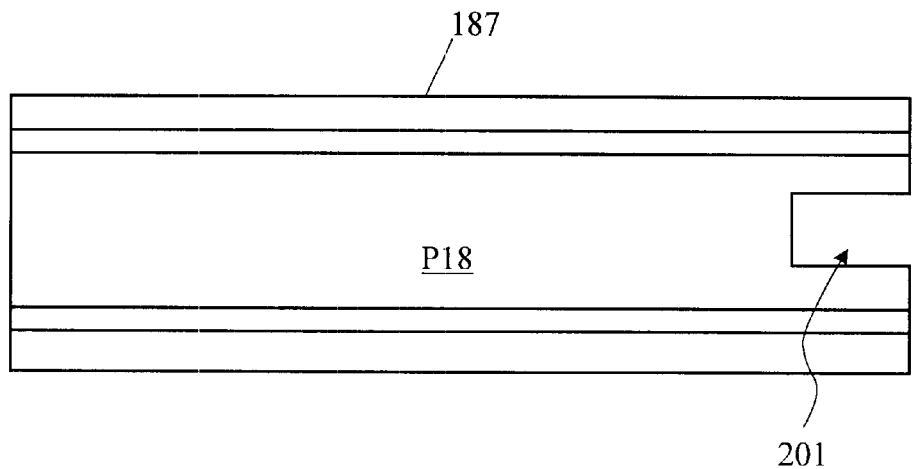
FIG. 6 is a top view of the I-beam section 187 of the inner case P18 of FIG. 5.

FIG. 6 is a top view of the I-beam section 187 of the inner case P18 showing a cut-out section 201 machined into the trailing edge of the top plate only of the I-beam section 187. The lower plate of the I-beam section 187 is identical except that there is no cut-out section 201.

Figure 7:
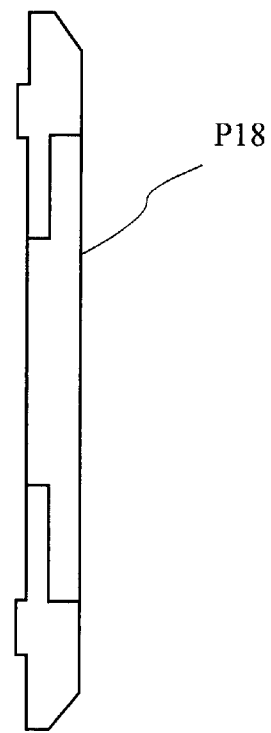
FIG. 7 is a detailed end view showing the chamfered cross-section of both side walls of the I-beam section 187 as in FIGS. 5 and 6.

FIG. 7 is a detailed end view showing the cut-out 201 of the top plate of the I-beam section 187. The cut-out 201 is to allow the inner case P18 to telescope without hitting the break-away lever 10.

Figure 8:
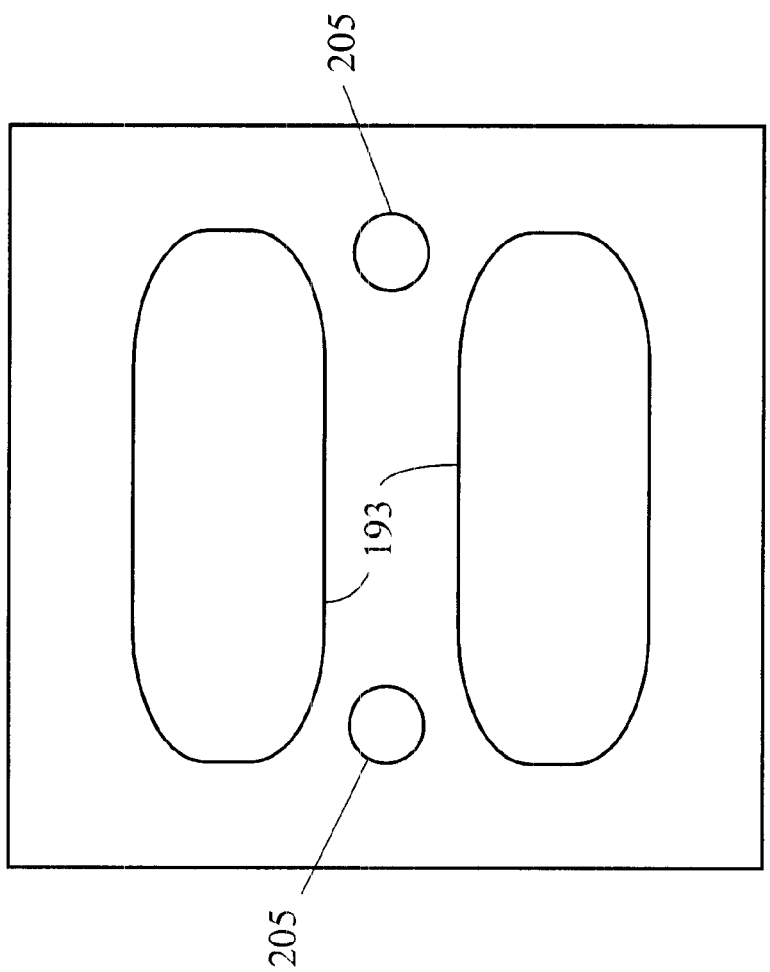
FIG. 8 is a side view of one of the side reinforcement plates 195.

FIG. 8 is a side view of one of the side reinforcement plates 195 illustrating the oblong grooves 193 machined therein. Grooves 193 conform to the grooves in the walls of the I-beam section 187 once side reinforcement plates 195 are secured in place, and this offers significant reinforcement. A pair of holes 205 are machined into the mid section of the side reinforcement plates 195 to accept the bolts 196 for attachment to the walls inside the hollow of the I-beam 187.

Referring back to FIG. 1 the master cylinder assembly 2 is seated inside the hollow of the outer case P1. Master cylinder assembly 2 is preferably a commercially available hydraulic master cylinder 19 preferably having a 1¼" bore, and an upwardly directed filler cap 21. A rubber gasket 22 and compression fitting 23 allows coupling of a conventional air brake hose thereto. The compression fitting 23 is preferably a 3/16" inverted seat connector with a 0.040 bleed orifice, a variety of suitable compression fittings 23 being readily available commercial parts. The master cylinder 19 is secured inside the outer case P1 by a pair of identical damped cylinder bracket assemblies 24 to be described. The cylinder bracket assemblies 24 are bolted through the master cylinder 19 by a pair of ⅜" hex bolts 25 secured by ⅜" hex nuts 26 and lock washers 27, and each bracket assembly 24 is further bolted inside the outer case P1 by a pair of hex bolts 17 secured by lock washers 14. The master cylinder 19 is operatively equipped with a push rod assembly 20 for actuating the trailer brakes.

Figure 9:
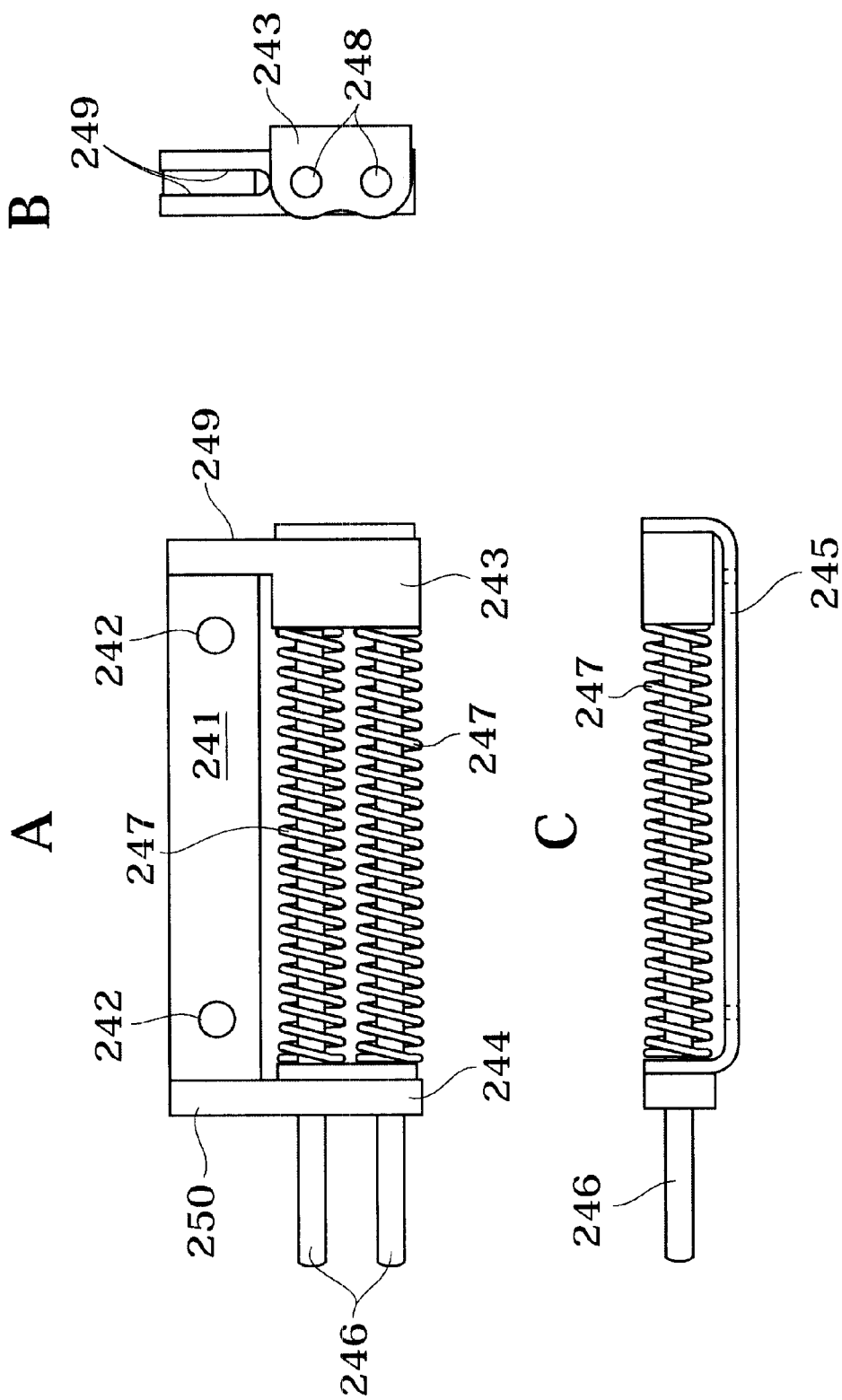
FIG. 9 is a composite drawing showing a side view, end view and bottom view (clockwise from top) of one of the damped cylinder bracket assemblies 24.

FIG. 9 is a composite drawing showing a side view (A), end view (B) and bottom view (C) (clockwise from top) of one of the damped cylinder bracket assemblies 24. Each cylinder bracket assembly 24 includes a cylinder frame strap 241 defined by opposing holes 242 for insertion of hex bolts 25. The cylinder frame strap 241 is slidably supported within the upwardly directed yoke 249 of a cylinder frame front 243, and a like yoke 250 of a cylinder frame rear 244. An arcuate spring strap 245 is coupled as shown between the cylinder frame front 243 and rear 244 and this slidably supports a pair of spring rods 246. The spring rods 246 are identical rods of hardened steel, preferably approximately 8" in length and 0.3120" in diameter with beveled ends. Spring strap 245 also confines a pair of die springs 247 which are inserted onto the respective spring rods 246. The die springs 247 are standard spring steel dimensioned to fit over the spring rods 246. This configuration of the cylinder bracket assemblies 24 provides a sliding degree of spring-damped freedom to the master cylinder 19 which is secured to the cylinder frame strap 241.

Figure 10:
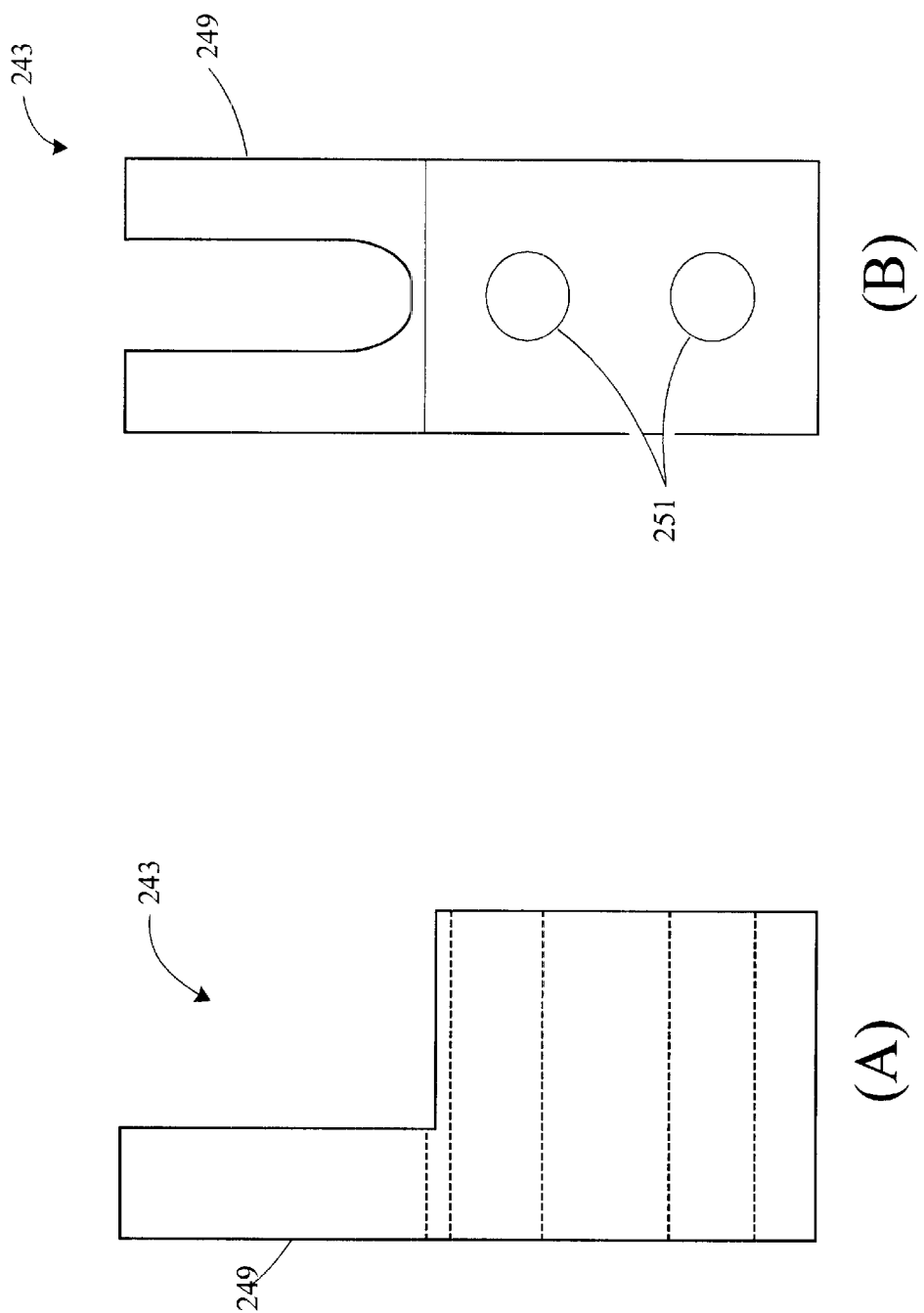
FIG. 10 is a composite drawing inclusive of a side view and end view of the cylinder frame front 243.

FIG. 10 is a composite drawing inclusive of a side view (A) and end view (B) of the cylinder frame front 243 which is a generally rectangular member defined by parallel holes 251 in the base section for slidable passage of spring rods 246, and an upwardly directed yoke 249 for supporting the cylinder frame strap 241.

Figure 11:
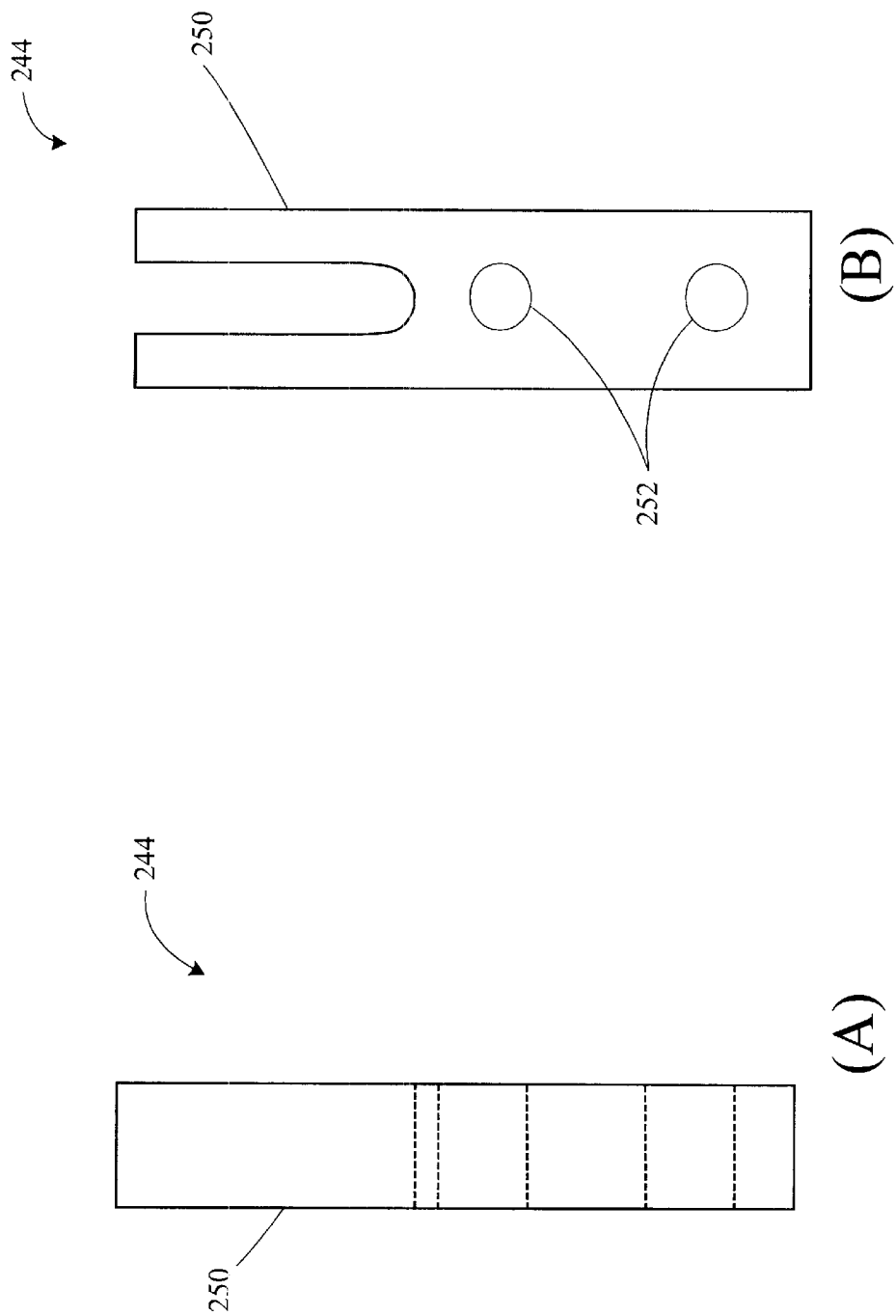
FIG. 11 is a composite drawing inclusive of a side view and end view of the cylinder frame rear 244.

FIG. 11 is a composite drawing inclusive of a side view (A) and end view (B) of the cylinder frame rear 244 which is a strip defined by parallel holes 252 in the base section for slidable passage of spring rods 246, and an upwardly directed yoke 250 for supporting the cylinder frame strap 241.

Figure 12:
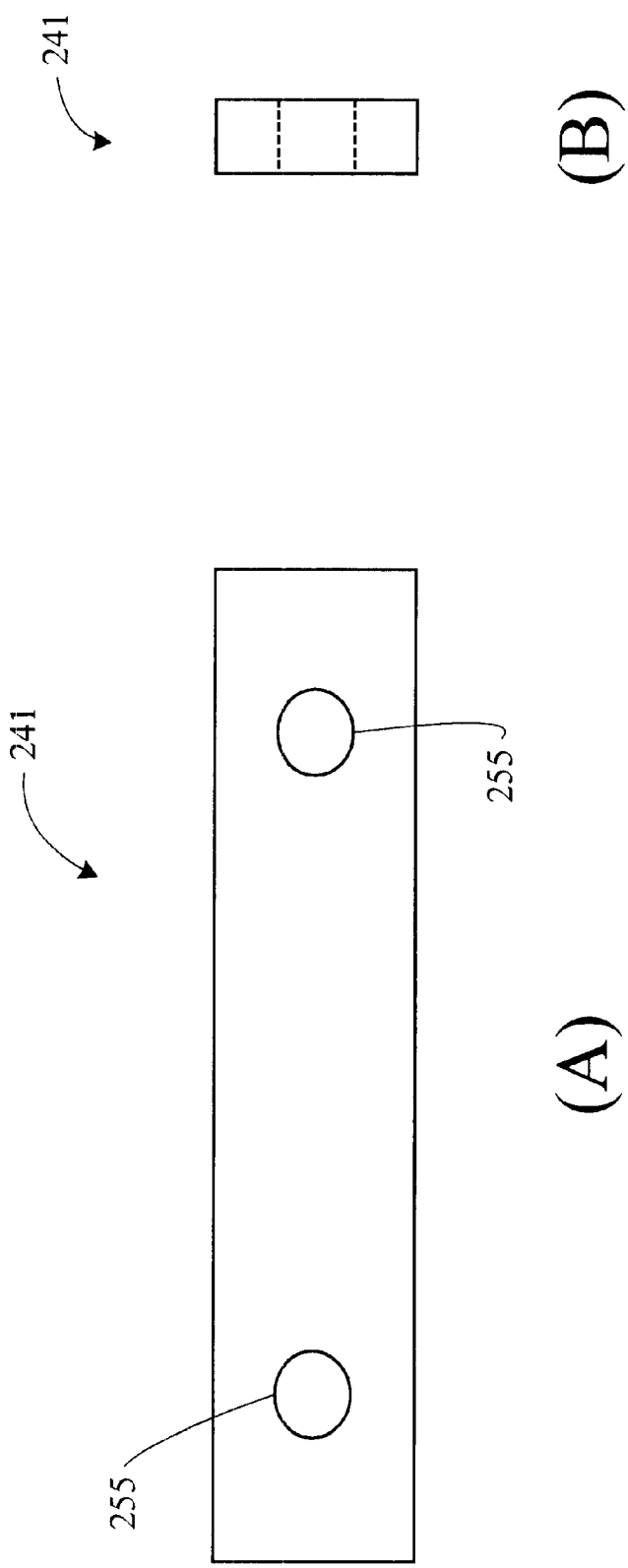
FIG. 12 is a composite drawing inclusive of a side view and end view of the cylinder frame strap 241.

FIG. 12 is a composite drawing inclusive of a side view (A) and end view (B) of the cylinder frame strap 241 that is slidably supported between the cylinder frame front and rear 243, 244. Cylinder frame strap 241 is a metal strip defined by mounting holes 255 for passage of bolts 25 (see FIG. 1) and attachment thereby to the master cylinder 19.

Figure 13:
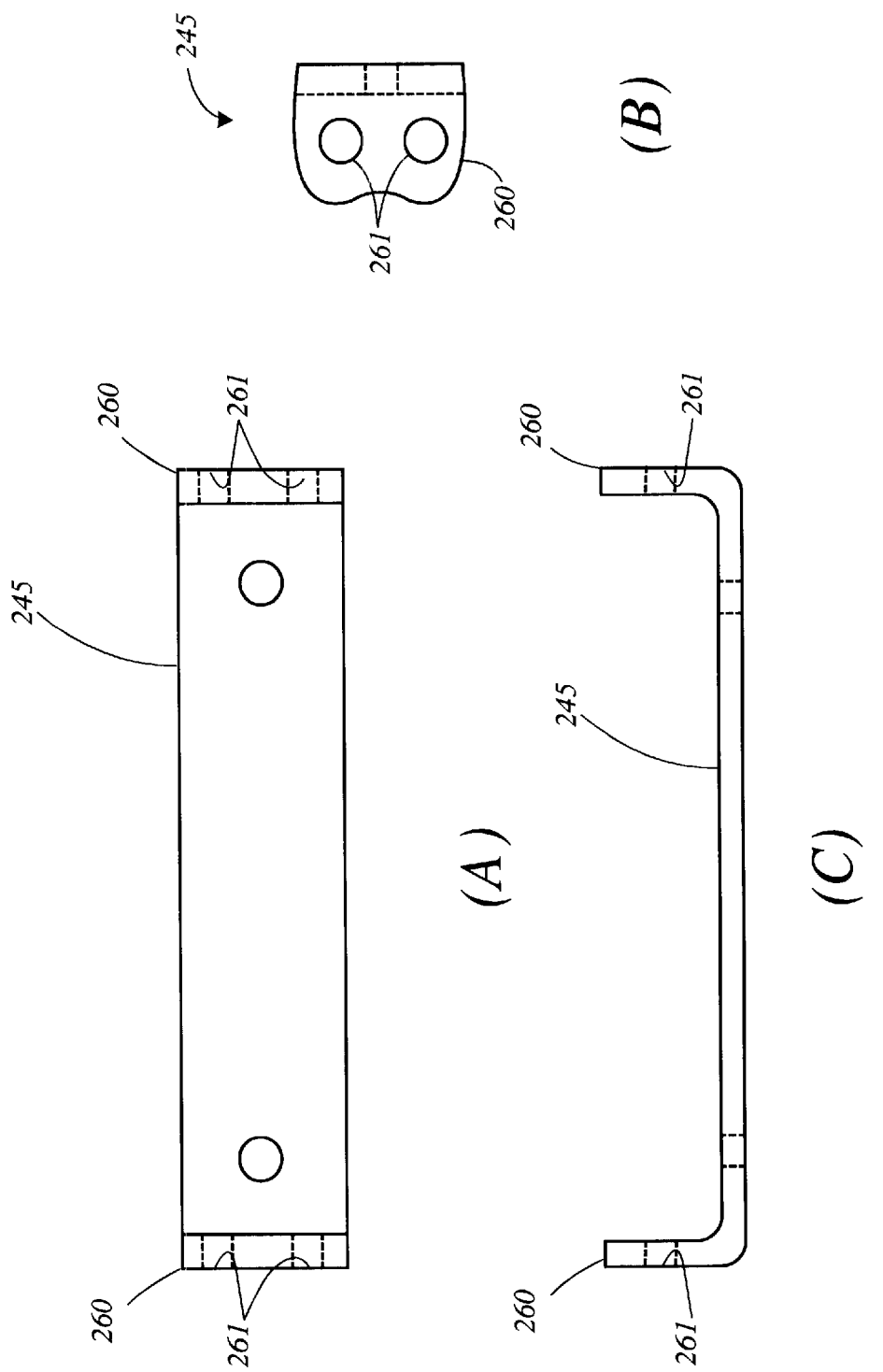
FIG. 13 is a composite drawing showing a side view, end view and top view (clockwise from top) of the arcuate spring strap 245.

FIG. 13 is a composite drawing showing a side view (A), end view (B) and top view (C) (clockwise from top) of the arcuate spring strap 245 that is coupled between the cylinder frame front 243 and rear 244 for slidably supporting the spring rods 246. The spring strap 245 has two spaced parallel extensions 260 each defined by a pair of spaced holes 261.

Figure 14:
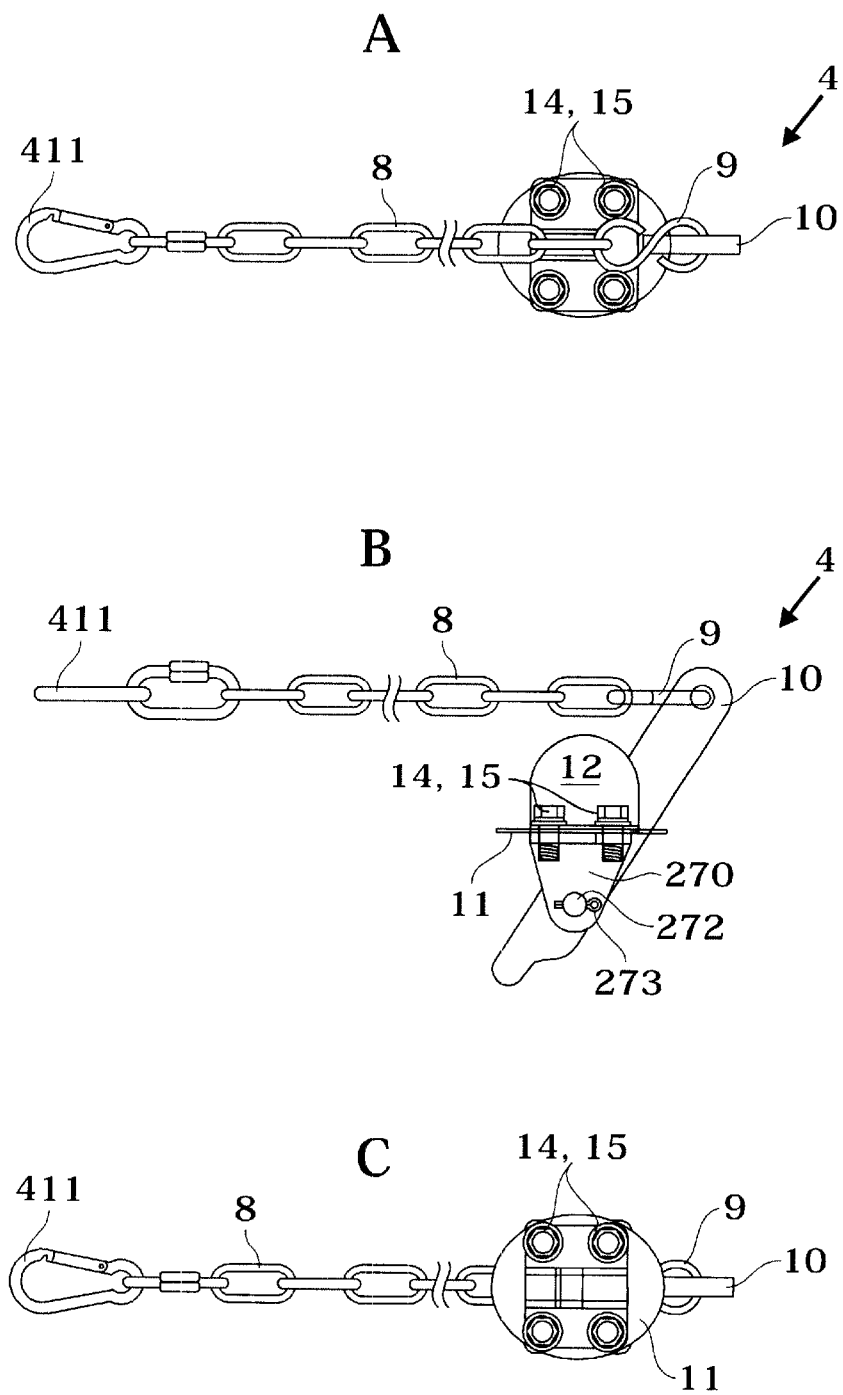
FIG. 14 is a composite drawing showing a top view, side cross-section view and bottom view (from the top) of the safety release assembly 4 as in FIG. 1.

FIG. 14 is a composite drawing showing a top view (A), side cross-section view (B) and bottom view (C) of the safety release assembly 4. Safety release assembly 4 includes a breakaway chain 8 with an end-mounted clasp 411 for attachment to the towing vehicle. An approximate 3 ft. chain is suitable for breakaway chain 8. The chain 8 is attached to the upper end of a break-away lever 10 by a standard S-hook 9. The lower end of the break-away lever 10 is pivotally mounted inside the outer case P1 by lever mounting brackets 270 that support a clevis pin 272 inserted through the break-away lever 10. Clevis pin 272 is secured in the break-away lever 10 by a cotter pin 273. The lever mounting brackets 270 are bolted by bolts 15 and lockwashers 14 to the top wall of outer case P1, and a small window is provided through the outer case P1 to allow the lower end of the break-away lever 10 to protrude down through. The lower end of the break-away lever 10 bears directly against the push-rod assembly 20 and, subsequently, against the master cylinder 19. This way, if the towing vehicle somehow becomes uncoupled from the towed transport, the chain 8 attached to vehicle will pull taught and this will throw the upper end of break-away lever 10 forward, thereby levering the master cylinder P1 rearward and applying the trailer brakes. Preferably, the window in the outer case P1 is sealed by a rubber weather seal 11 with a slit for passage of the lever 10. Break-away locks 12, 13 are secured atop the weather seal 11 each by a pair of hex bolts 15 through lock washers 14. The break-away locks 12, 13 catch the lever 10 and maintain it in a normally disengaged position until a significant force on chain 8 overcomes the friction.

Figure 15:
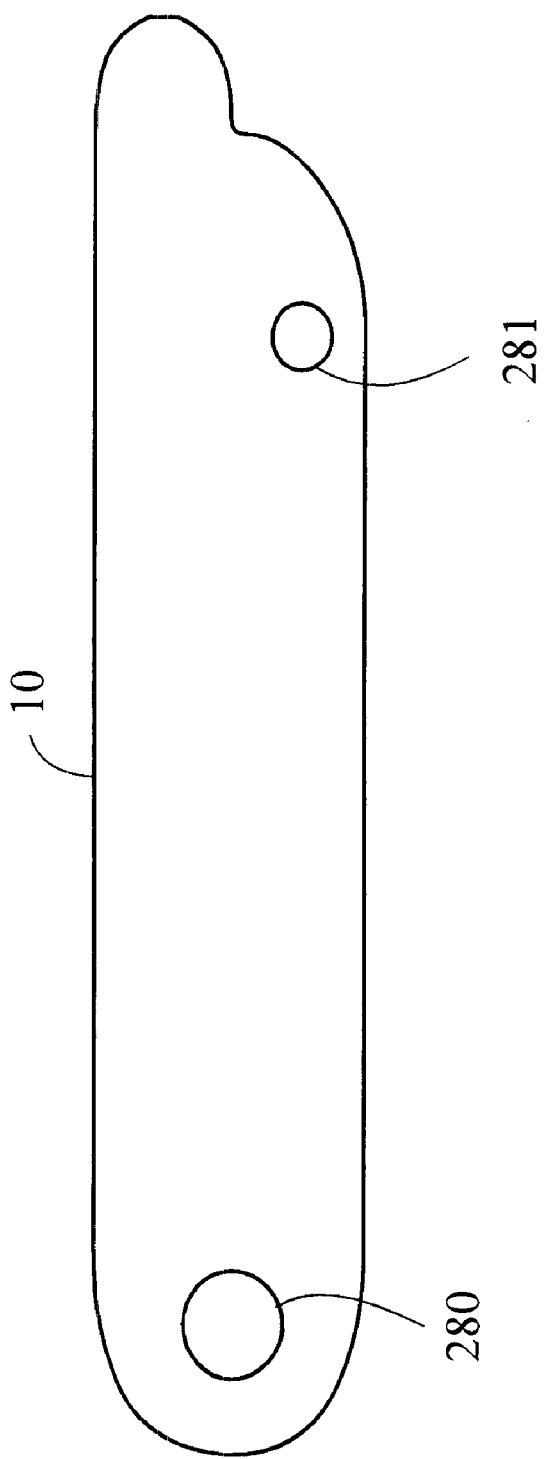
FIG. 15 is a side view of the a break-away lever 10 of FIG. 14.

FIG. 15 is a side view of the a break-away lever 10 which is a substantially flat section of metal plate. The lever 10 is formed with a hole 280 at one end for insertion of S-hook 9. The other end of the break-away lever 10 is adapted to conform to the contour of the master cylinder 19 that it bears against. A pivot hole 281 is provided for insertion of clevis pin 272.

Figure 16:
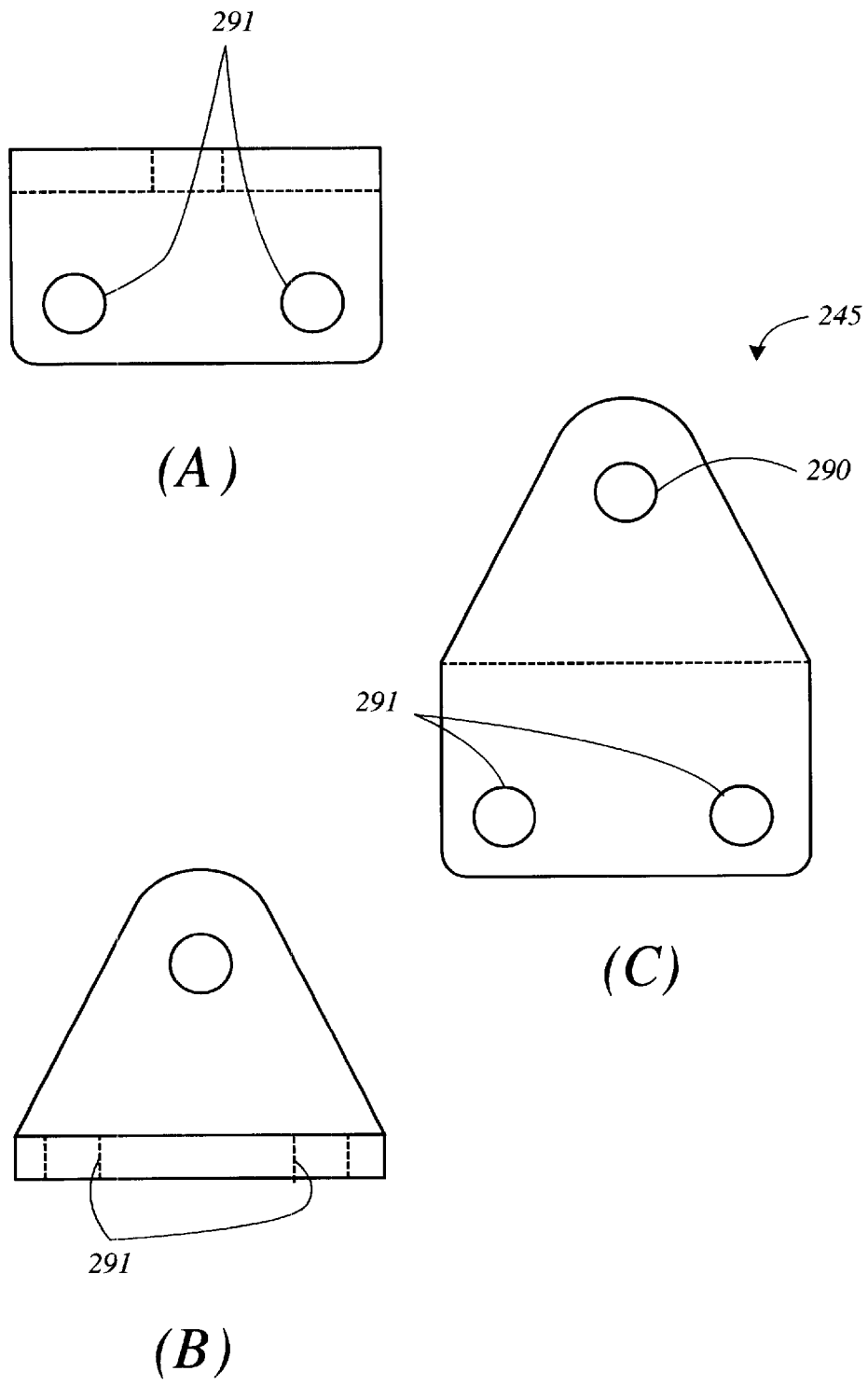
FIG. 16 is a composite drawing showing a top view side view and pattern view (counterclockwise from top) of one of the lever mounting brackets 270 as in FIG. 1.

FIG. 16 is a composite drawing showing a top view (A), side view (B) and pattern view (C) (counter-clockwise from top) of one of the lever mounting brackets 270. Both lever mounting brackets 270 are steel sections (patterned as shown at (C) with pivot hole 290 and spaced mounting holes 291. The steel sections are bent along the dotted line to provide an offset pivotable mounting for lever 10 on outer case P1.

FIG. 17 is a composite drawing showing a top view (A), side view (B) and pattern view (C) (counter-clockwise from top) of one of the lever locks 12,13. Both lever locks 12, 13 are steel sections patterned as shown at (C) with spaced mounting holes 293 and a tapered tab 294 at the top to allow the lever 10 to be set in a disengaged position and to maintain it there, as well as to lock the brakes on upon engagement of the lever 10. Both lever locks 12, 13 are bent along the dotted line to provide an upward mounting atop the outer case P1, and to angle the tab 294 inward slightly in order to facilitate setting of and to catch the lever 10.

Figure 18:
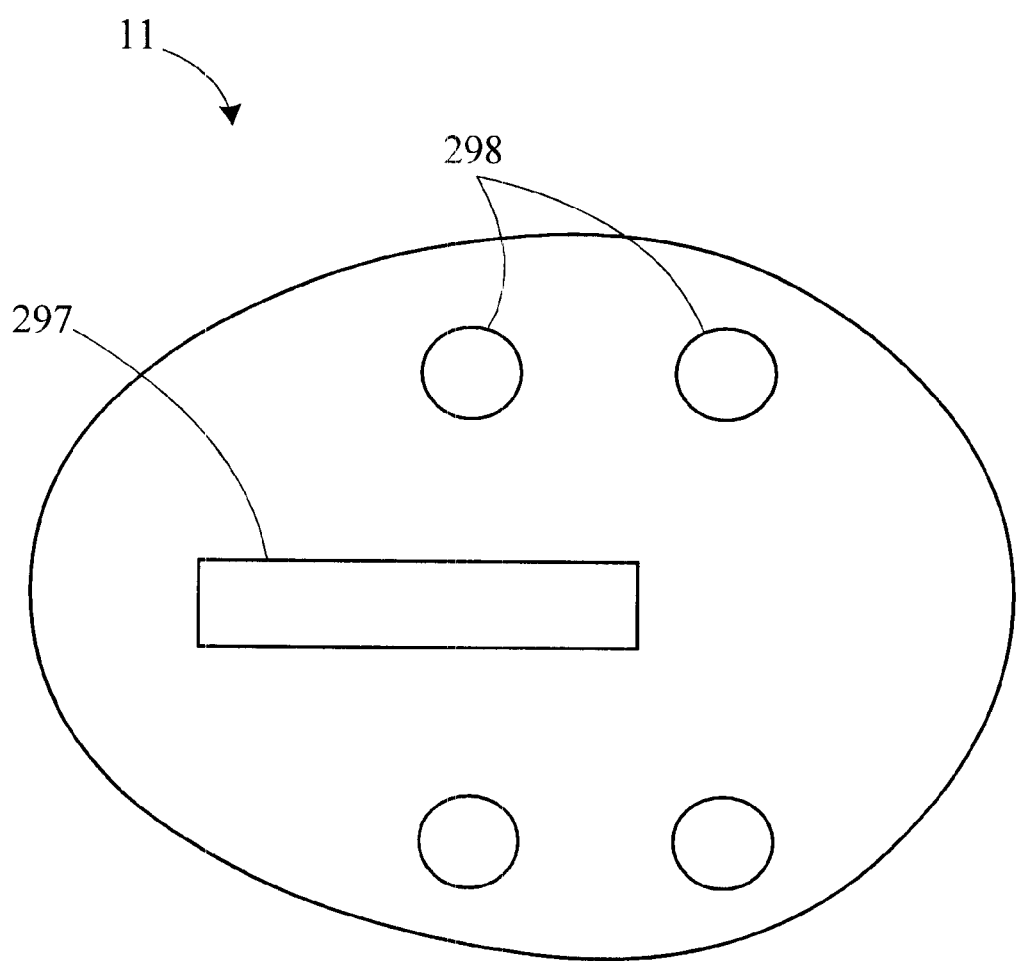
FIG. 18 is a side view of the weather seal 11 of FIG. 14.

FIG. 18 is a side view of the weather seal 11 for sealing the window in the outer case P1. Weather seal 11 is preferably an oval rubber section defined by a slit 297 for passage of the lever 10, and four holes 298 for insertion of bolts 15.

Referring back to FIG. 2, four adjustable rollers 5 (inclusive of two front rollers and rear rollers) are mounted on each side wall of the outer casing P1 and bear against the projecting edges of the inner casing P18 to facilitate sliding thereof. The rollers 5 ride against a corresponding overhanging edge of the I-beam 187. As seen in FIG. 1, each roller 5 further comprises a wheel P2 that is rotatably mounted on an axle P3. Wheel P2 is secured to axle P3 by a bolt P4 and washer P5 combination, the bolt P4 being threaded into the end of axle P3. Wheels P2 may be simple annular steel members.

FIG. 19 is a composite side view (A) and end view (B) of an exemplary roller axle P3. Roller axle P3 comprises an outer hub 300 for retaining the wheels P2, a circular midsection 310 for seating the wheels P2 and an offset square end section 320 to facilitate adjustment. The entire roller axle P3 is defined by a threaded central through-bore for insertion of the bolt P4 and washer P5 combination as seen in FIG. 1. When assembled to the outer case P1, the offset square end section 320 of roller axle P3 is inserted into a conforming square hole in outer case P1. The capability for adjustment is important because prolonged operation of the trailer coupling/brake actuator 1 can result in wear tolerances. Specifically, the rollers 5 may wear and lose their effectiveness. Thus, the square end section 320 is selectively off set from the center axis to facilitate four vertical clearance settings of wheels P2 with respect to I-beam P18. Presently, the dimensions are as shown in FIG. 19 to provide a selectable 0.235", 0.219", 0.265" or 0.281" offset. The degree of off set is selected simply by removing bolt P4 and axle P3, rotating in increments of 90 degrees, and reinstalling.

Figure 20:
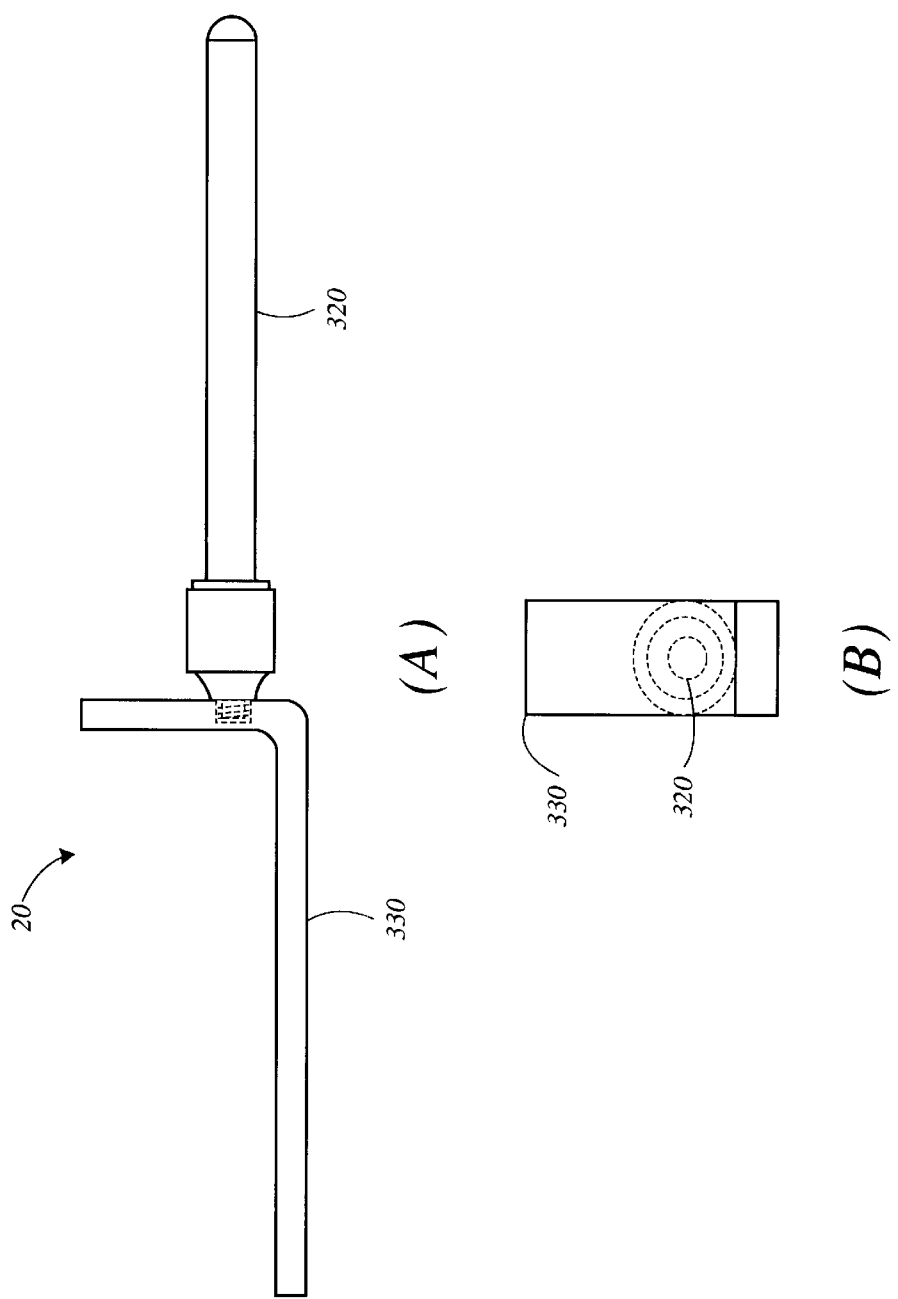
FIG. 20 is a composite drawing inclusive of a close-up side view and end view of the push-rod assembly 20.

As previously stated, the master cylinder 19 is operatively equipped with a push rod assembly 20 for actuating the trailer brakes and FIG. 20 is a composite drawing inclusive of a close-up side view (A) and end view (B) of the push-rod assembly 20. Push-rod assembly 20 further comprises an angled push-rod lever 330 that is screwed onto a push-rod 335.

Figure 21:
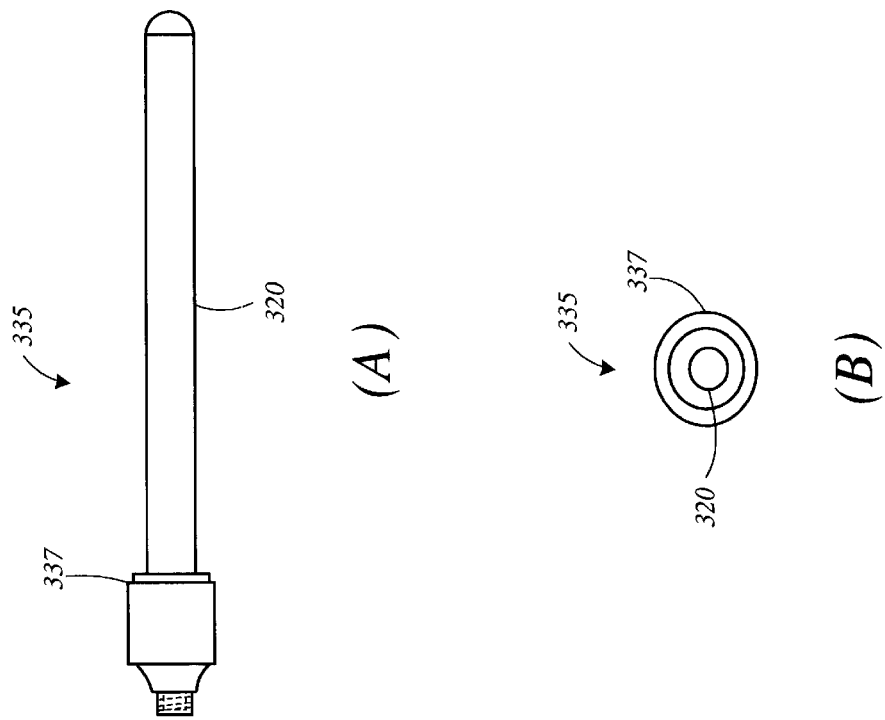
FIG. 21 is a close-up side view of the push-rod 335 of FIG. 20.

FIG. 21 is a composite drawing inclusive of a close-up side view (A) and end view (B) of the push rod 335. Push-rod 335 generally comprises a length of carbon steel or the like having a rounded tip for insertion into master cylinder 19, and a threaded end for attachment of angled push-rod lever 330. A collar 337 provides a backing for the angled push-rod lever 330, and a filleted portion surrounds the other side of collar 337 for a rubber boot to fit over.

FIG. 22 is a composite side view (A) and end view (B) of the angled push-rod lever 330 which is a section of steel plate bent at an approximate 90 degree angle and formed with a hole 339 therein. The angled push-rod lever 330 is operatively engaged with the inner case assembly 3 (bearing against push-rod pin 28 at the leading end of the I-beam inner case assembly P18) and urged forward into the master cylinder 19 for actuating the trailer brakes.

FIG. 23 is a composite side view (A) and end view (B) of the push-rod pin 28 for insertion through holes in the walls of the I-beam 187. The push-rod pin 28 is pre-drilled with distal through-bores 340 to accept the two cotter pins 129 (not shown in FIG. 23), and its ends are beveled to facilitate easier insertion.

Referring back to FIG. 1, the telescoping extension of inner case assembly 3 is damped by two pneumatic cylinders 29 both of which are attached between the inner case assembly 3 and master cylinder assembly 2. There are a variety of commercially available pneumatic cylinders that will suffice for this purpose, and the presently preferred embodiment employs cylinders that fit the following dimensional and performance constraints:

Collapsed length (collar to collar): 6"±0.125

Extended length ("): 8.07"±0.125

Stroke: 2.07"

Tensile Strength: 3000 lbf

Diameter: 1.63"

The pistons of the pneumatic cylinders 29 are each secured at one end to the corresponding master pins 31 which ride along the oblong grooves 193 formed in both walls of the I-beam section 187. The other ends of the pneumatic cylinders 29 are pivotally attached to the inner side walls of the hollow I-beam 187 by a pair of spaced damper pins 188.

FIG. 24 is a composite side view (A) and end view (B) of an exemplary master pin 31 for insertion through the push rod collar of the pneumatic cylinder 29. The master pin 31 is pre-drilled with a distal through-bore 381 to accept a cotter pin 32 (not shown in FIG. 24), and the ends are beveled to facilitate easier insertion. A flange 382 at the other end limits insertion.

FIG. 25 is a composite side view (A) and end view (B) of an exemplary damper pin 188 for insertion through the collar of a pneumatic cylinder 29. The damper pin 188 is pre-drilled with a distal through-bore 391 to accept a cotter pin 6 (not shown in FIG. 25), and the ends are beveled to facilitate easier insertion. A flange 392 at the other end limits insertion.

Referring back to FIG. 1, a rectangular window 400 is formed in the outer case P1 to provide access to the fill cap 21 of the master cylinder 19, and this covered by an access cover 16.

FIG. 26 is a composite side view (A) and end view (B) of an exemplary access cover 16. Access cover 16 may be formed from a flat section of steel plate that is cut and bent to form a shallow enclosure bounded on the top and sides, and with laterally protruding brackets 402. Both brackets 402 are defined by holes 404 by which the access cover 16 can be bolted to the outer case P1.

In operation of the foregoing, the lunette 185 is attached to the vehicle as is the chain 8 of safety release assembly 4. Should the trailer begin to override the towing vehicle, the outer case P1 and I-beam inner case assembly P18 compress together (aided by rollers 5), and the push-rod pin 28 bears against the angled push-rod lever 330 urging push-rod 335 into the master cylinder 19 of the trailer brake actuator, which in turn (via a connected air brake hose) applies the trailer brakes to reduce the force of inertia in the trailer. This greatly reduces the amount of work required for the pulling vehicle's brakes to stop the trailer. When the pulling vehicle accelerates, or remains at constant speed, the inertia and/or drag of the trailer is responsible for creating a tensile force between the trailer and pulling vehicle. This tensile force deactivates the brakes. This allows the actuator to function only when the trailer is forcing the pulling vehicle forward and not when the pulling vehicle is pulling the trailer. Safety release assembly 4 operates to prevent accidents in case the trailer inadvertently becomes uncoupled.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A trailer coupling, and brake actuator comprising:
   an outer case formed as a section of hollow beam with opposing side-walls;
   a plurality of rollers mounted exteriorly on the opposing side-walls of the outer case;
   an inner case formed as a section of I-beam with projecting edges, said inner case being dimensioned for a telescoping fit inside said outer case with each of said plurality of rollers bearing against a projecting edge of said inner case;
   whereby said inner case and outer case provide a low-friction telescoping engagement between a trailer and towing vehicle.

2. The combination trailer coupling and brake actuator according to claim 1, wherein said plurality of rollers further comprise eight rollers, four of said rollers being mounted exteriorly on each side-wall of said outer case.

3. The combination trailer coupling and brake actuator according to claim 1, wherein each of said rollers further comprises an axle and a selectably offset wheel mounted on said axle to allow adjustment of the degree of support against the projecting edges of said I-beam inner case.

4. The combination trailer coupling and brake actuator according to claim 3, wherein each of said rollers further comprises an axle bounded at one end by a cap, a threaded central bore into the other end of the axle, and a substantially square peripheral cross-section at said other end defined by four surfaces each spaced at a different offset from said central bore, whereby said axle may be inserted at a selected angular orientation into a conforming square hole in said outer casing and bolted thereto to space said wheel at a chosen offset from said central bore, thereby allowing adjustment of the degree of support against the lateral ridges of said I-beam.

5. A combination trailer coupling and brake actuator for applying trailer brakes, comprising:
   an outer case formed as a section of hollow beam with opposing side-walls;
   a plurality of rollers mounted exteriorly on the opposing side-walls of the outer case;
   an inner case formed as a section of I-beam with projecting edges, said inner case being dimensioned for a telescoping fit inside said outer case with each of said plurality of rollers bearing against a projecting edge of said inner case, said inner case and outer case providing a low-friction telescoping engagement.
   a master cylinder mounted inside said outer case and having a piston operatively engaged with said inner case, and a brake hose coupling for connection to and activation of said trailer brakes.

6. The combination trailer coupling and brake actuator according to claim 5, further comprising a safety release assembly including a break-away lever pivotally mounted on said outer case and having one end in operative engagement with said master cylinder, the other end of said break-away lever having a chain attached thereto for coupling to a towing vehicle, whereby inadvertent separation of the towing vehicle from said coupling/brake actuator pulls said chain, pivots said break-away lever, and activates the master cylinder to apply the trailer brakes to prevent accidents.

7. The combination trailer coupling and brake actuator according to claim 5, wherein the outer case comprises a generally square tubular section with a plurality of reinforcing plates welded to the sides of the outer case.

8. The combination trailer coupling and brake actuator according to claim 5, wherein said plurality of rollers further comprise eight rollers, four of said rollers being mounted exteriorly on each side-wall of said outer case.

9. The combination trailer coupling and brake actuator according to claim 5, wherein each of said rollers further comprises an axle and a selectably offset wheel mounted on said axle to allow adjustment of the degree of support against the projecting edges of said I-beam inner case.

10. The combination trailer coupling and brake actuator according to claim 9, wherein each of said rollers further comprises an axle bounded at one end by a cap, a threaded central bore into the other end of the axle, and a substantially square peripheral cross-section at said other end defined by four surfaces each spaced at a different offset from said central bore, whereby said axle may be inserted at a selected angular orientation into a conforming square hole in said outer casing and bolted thereto to space said wheel at a chosen offset from said central bore, thereby allowing adjustment of the degree of support against the lateral ridges of said I-beam.

11. A combination trailer coupling and brake actuator for applying trailer brakes, comprising:
    an outer case formed as a section of hollow beam with opposing side-walls;
    a plurality of rollers mounted exteriorly on the opposing side-walls of the outer case;
    an inner case formed as a section of I-beam with projecting edges, said inner case being dimensioned for a telescoping fit inside said outer case with each of said plurality of rollers bearing against a projecting edge of said inner case, said inner case and outer case providing a low-friction telescoping engagement;
    a master cylinder mounted inside said outer case and having a push-rod and a brake hose coupling for connection to and activation of said trailer brakes; and
    at least one damping cylinder fixedly attached at one end to said inner case and having a damping piston at the other end operatively engaged with the piston of said master cylinder for urging said master cylinder to activate said trailer brakes when said inner case and outer case are compressed together.

12. The combination trailer coupling and brake actuator according to claim 11, further comprising a push-rod pin slidably carried by said inner case, the piston of the damping cylinder being coupled to said push rod pin, and said push rod pin bearing against the push-rod of the master cylinder to activate said trailer brakes when said inner case and outer case are compressed together.

13. The combination trailer coupling and brake actuator according to claim 12, wherein said at least one damping cylinder further comprises a pair of damping cylinders both fixedly attached at one end to said inner case and both having damping pistons coupled to a respective push rod pin, and said push rod pins bearing against the push-rod of the master cylinder to activate said trailer brakes when said inner case and outer case are compressed together.

14. The combination trailer coupling and brake actuator according to claim 11, wherein said master brake cylinder is mounted to said outer case on damped spring-brackets.

* * * * *